(12) United States Patent
Goodwin et al.

(10) Patent No.: US 7,698,255 B2
(45) Date of Patent: Apr. 13, 2010

(54) SYSTEM FOR ORGANIZING KNOWLEDGE DATA AND COMMUNICATION WITH USERS HAVING AFFINITY TO KNOWLEDGE DATA

(75) Inventors: James P. Goodwin, Beverly, MA (US); Carl J. Kraenzel, Boston, MA (US); Andrew L. Schirmer, Andover, MA (US); David L. Newbold, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/341,583

(22) Filed: Jan. 14, 2003

(65) Prior Publication Data

US 2003/0154196 A1 Aug. 14, 2003

Related U.S. Application Data

(60) Provisional application No. 60/347,283, filed on Jan. 14, 2002.

(51) Int. Cl.
*G06F 17/30* (2006.01)
(52) U.S. Cl. .................... 707/3; 707/9; 707/10; 706/45
(58) Field of Classification Search .................... 707/9, 707/3, 10; 705/14; 706/45
See application file for complete search history.

(56) References Cited

U.S. PATENT DOCUMENTS

| | | | |
|---|---|---|---|
| 4,744,028 A | 5/1988 | Karmarkar | 364/402 |
| 5,740,549 A * | 4/1998 | Reilly et al. | 705/14 |
| 5,761,512 A | 6/1998 | Breslau et al. | 395/705 |

(Continued)

FOREIGN PATENT DOCUMENTS

EP 1 087 306 3/2001

(Continued)

OTHER PUBLICATIONS

Mattox-D, Maybury-M, Morey-D; Enterprise Expert and Knowledge Discovery; Aug. 1999; Munixh, Germany; vol. 2; pp. 303-307; see enclosed printout.*

(Continued)

*Primary Examiner*—Apu M Mofiz
*Assistant Examiner*—Monica M Pyo
(74) *Attorney, Agent, or Firm*—Pillsbury Winthrop Shaw Pittman LLP

(57) ABSTRACT

A system, method, and processor readable medium for processing data in a knowledge management system gathers information content and transmits a work request for the information content gathered. The information content may be registered with a K-map and assigned a unique document identifier. A work queue processes the work requests. The processed information may then be transmitted to another work queue for further processing. Further processing may include categorization, full-text indexing, metrics extraction or other process. Control messages may be transmitted to one or more users providing a status of the work request. The information may be analyzed and further indexed. A progress statistics report may be generated for each of the processes performed on the document. The progress statistics may be provided in a record. A shared access to a central data structure representing the metrics history and taxonomy may be provided for all work queues via a CORBA service.

18 Claims, 23 Drawing Sheets

U.S. PATENT DOCUMENTS

| | | | |
|---|---|---|---|
| 5,815,830 A | 9/1998 | Anthony | 707/6 |
| 5,873,056 A | 2/1999 | Liddy et al. | 704/9 |
| 5,895,470 A | 4/1999 | Pirolli et al. | 707/102 |
| 5,966,707 A | 10/1999 | Van Huben et al. | 707/10 |
| 6,041,311 A | 3/2000 | Chislenko et al. | 705/27 |
| 6,078,918 A | 6/2000 | Allen et al. | 707/6 |
| 6,115,709 A * | 9/2000 | Gilmour et al. | 707/9 |
| 6,144,944 A | 11/2000 | Kurtzman, II et al. | 705/14 |
| 6,154,783 A | 11/2000 | Gilmour et al. | 709/245 |
| 6,205,472 B1 | 3/2001 | Gilmour | 709/206 |
| 6,208,994 B1 | 3/2001 | Abdelnur | 707/103 |
| 6,226,648 B1 | 5/2001 | Appleman et al. | 707/102 |
| 6,240,466 B1 | 5/2001 | McKeehan et al. | 709/316 |
| 6,269,369 B1 * | 7/2001 | Robertson | 707/10 |
| 6,349,295 B1 | 2/2002 | Tedesco et al. | 707/3 |
| 6,353,840 B2 | 3/2002 | Saito et al. | 707/517 |
| 6,377,949 B1 | 4/2002 | Gilmour | 707/10 |
| 6,377,983 B1 | 4/2002 | Cohen et al. | 709/217 |
| 6,397,203 B1 | 5/2002 | Hembry | 707/2 |
| 6,405,197 B2 | 6/2002 | Gilmour | 707/5 |
| 6,421,669 B1 | 7/2002 | Gilmour et al. | 707/9 |
| 6,513,039 B1 | 1/2003 | Kraenzel | 707/9 |
| 6,516,350 B1 | 2/2003 | Lumelsky et al. | 709/226 |
| 6,523,026 B1 | 2/2003 | Gillis | 707/3 |
| 6,553,365 B1 | 4/2003 | Summerlin et al. | 707/2 |
| 6,560,588 B1 | 5/2003 | Minter | 706/50 |
| 6,564,217 B2 | 5/2003 | Bunney et al. | 707/10 |
| 6,571,279 B1 | 5/2003 | Herz et al. | 709/217 |
| 6,601,026 B2 | 7/2003 | Appelt et al. | 704/9 |
| 6,604,110 B1 | 8/2003 | Savage et al. | 707/102 |
| 6,626,957 B1 | 9/2003 | Lippert et al. | 715/513 |
| 6,633,916 B2 | 10/2003 | Kauffman | 709/229 |
| 6,640,229 B1 * | 10/2003 | Gilmour et al. | 707/9 |
| 6,647,384 B2 | 11/2003 | Gilmour | 707/5 |
| 6,668,251 B1 | 12/2003 | Goldberg | 707/5 |
| 6,687,873 B1 | 2/2004 | Ballantyne et al. | 715/500 |
| 6,697,800 B1 | 2/2004 | Jannink et al. | 707/5 |
| 6,711,570 B1 | 3/2004 | Goldberg et al. | 707/6 |
| 6,714,936 B1 | 3/2004 | Nevin, III | 707/102 |
| 6,718,366 B2 | 4/2004 | Beck et al. | 709/204 |
| 6,732,331 B1 | 5/2004 | Alexander | 715/513 |
| 6,754,648 B1 | 6/2004 | Fittges et al. | 707/1 |
| 6,772,137 B1 | 8/2004 | Hurwood et al. | 707/2 |
| 6,789,054 B1 | 9/2004 | Makhlouf | 703/6 |
| 6,801,940 B1 | 10/2004 | Moran et al. | 709/224 |
| 6,816,456 B1 | 11/2004 | Tse-Au | 370/230.1 |
| 6,832,224 B2 | 12/2004 | Gilmour | 707/100 |
| 6,836,797 B2 | 12/2004 | Givoly et al. | 709/223 |
| 6,883,001 B2 | 4/2005 | Abe | 707/10 |
| 6,976,018 B2 | 12/2005 | Teng et al. | 707/3 |
| 7,043,698 B2 | 5/2006 | Newbold | 715/789 |
| 7,092,938 B2 | 8/2006 | Brown et al. | 707/4 |
| 7,152,059 B2 | 12/2006 | Monteverde | 707/3 |
| 7,185,001 B1 | 2/2007 | Burdick et al. | 707/3 |
| 7,206,778 B2 | 4/2007 | Bode et al. | 707/5 |
| 2002/0049621 A1 | 4/2002 | Bruce | 705/7 |
| 2002/0049750 A1 | 4/2002 | Venkatram | 707/3 |
| 2002/0078003 A1 * | 6/2002 | Krysiak et al. | 707/1 |
| 2002/0087600 A1 | 7/2002 | Newbold | 707/514 |
| 2002/0107861 A1 | 8/2002 | Clendinning et al. | 707/101 |
| 2002/0111934 A1 | 8/2002 | Narayan | 707/1 |
| 2002/0152244 A1 | 10/2002 | Dean et al. | 707/530 |
| 2003/0028525 A1 | 2/2003 | Santos et al. | 707/3 |
| 2003/0105732 A1 | 6/2003 | Kagalwala et al. | 707/1 |
| 2004/0068477 A1 | 4/2004 | Gilmour et al. | 707/1 |
| 2004/0111386 A1 | 6/2004 | Goldberg et al. | 707/1 |
| 2004/0205548 A1 | 10/2004 | Bax et al. | 715/513 |

FOREIGN PATENT DOCUMENTS

| | | |
|---|---|---|
| EP | 1 143 356 | 10/2001 |
| WO | WO 00/45308 | 8/2000 |

OTHER PUBLICATIONS

"Agents to Assist in Finding Help" by Adriana Vivacqua and Henry Lieberman, Apr. 2000, for Conference for Human Factors & Computing Systems Proceedings, in the Hague, the Netherlands, pp. 65-72.*

Maybury et al., "Expert Finding for Collaborative Virtual Environments", *Communications of the ACM*, vol. 44, No. 12, Dec. 2001, pp. 1, 2, 55, 56.

Mattox et al., "Enterprise Expert and Knowledge Discovery", *Proceedings of the International Conference on Human Computer Interaction Conference*, Aug. 23-27, 1999, Munich, Germany, 11 pages.

"Automated Expertise Profiling Saves Time", http://www.tacit.com/products/profiling.html, printed Jan. 9, 2002, 3 pages.

"Knowledge Mail", http://www.tacit.com/products/knowledgemail.html, printed Jan. 9, 2002, 3 pages.

"Expertise Discovery & Search", http://www.tacit.com/products/espdiscovery.html, printed Jan. 9, 2002, 2 pages.

Vivacqua, Adriana, et al., "Agents to Assist in Finding Help", *Conference on Human Factors & Computing Systems Proceedings*, in the Hague, the Netherlands, Apr. 2000, pp. 65-72.

Tacit, KnowledgeMail & KnowledgeMail Plus, "Creating the Smarter Enterprise" (Tacit Knowledge Systems, Inc., © May 2001).

http://www.forbes.com/global/2001/0205/088_print.html, as it appears on Feb. 26, 2001.

McDonald, David W., "Evaluating Expertise Recommendations", *Proceedings of the 2001 International ACM SIGGROUP Conference on Supporting Group Work*, in Boulder, Colorado, Oct. 2, 2001, pp. 214-223.

http://www.tacit.com, as it appears on Dec. 7, 2000.

Wang, Jidong, et al., "Ranking User's Relevance to a Topic Through Link Analysis on Web Logs", *Proceedings of the 4th International Workshop on Web Information and Data Management* in McLean, Virginia, ACM Press, Nov. 8, 2002, pp. 49-54.

Raschid, Louiqa, et al., "Interoperable Query Processing with Multiple Heterogeneous Knowledge Servers", *ACM*, 1993, pp. 461-470.

Jenkins, Clare, "User Studies: Electronic Journals and User Response to New Modes of Information Delivery", *Library Acquisitions: Practice & Theory*, vol. 21, No. 3, 1997, pp. 355-363.

* cited by examiner

SYSTEM FOR ORGANIZING KNOWLEDGE DATA AND COMMUNICATION WITH USERS HAVING AFFINITY TO KNOWLEDGE DATA

RELATED APPLICATIONS

This application claims priority from a U.S. Provisional Patent Application filed Jan. 14, 2002, titled, "Knowledge Server," Ser. No. 60/347,283, which is hereby incorporated by reference. This application is related to co-pending patent applications titles "System and Method for Processing Data in a Distributed Architecture," Ser. No. 10/045,064, and "System and Method for Using XML to Normalize documents," Ser. No. 10/044,913, filed on Jan. 15, 2002, which are hereby incorporated by reference. This application is also related to co-pending patent applications titled "A System and Method for Mapping Knowledge Data based on User's Affinity to Knowledge," Ser. No. 10/341,591, "A System for Organizing Knowledge Data and Communicating with Users Having Affinity to Knowledge Data," Ser. No. 10/341,588, "A System for Synchronizing of User's Affinity to Knowledge," Ser. No. 10/341,584, "A System for Categorizing and Normalizing Knowledge Data Based on User's Affinity to Knowledge," Ser. No. 10/341,585, and "A System and Method for Distributing Services for Knowledge Management Processing," Ser. No. 10/341,587, each of which was filed herewith on Jan. 14, 2003, and incorporated herein by reference.

FIELD OF THE INVENTION

The invention relates generally to knowledge management systems and more particularly to a system and method for organizing knowledge data and communicating with users having affinity to knowledge data.

BACKGROUND OF THE INVENTION

Knowledge management systems, which are generally known, may be used, for example, to gather information from various information systems within an organization. The knowledge management system may perform one or more processing actions on the gathered information, such as, for example, categorization, full-text indexing, and metrics extraction, etc. Existing knowledge management systems attempt to provide access to large amounts of information in databases on a network or even in personal computers and gather this information for users of the system. However, merely accessing and/or gathering this information has limited value to a user without understanding a relationship between the user and the information.

Existing knowledge management systems typically access and/or gather the information from data sources without knowing or understanding a user's relationship to the information, relationships of the information to other persons or users of the system, and/or relationships that may exist within the information itself. Thus, many times these systems provide the user with irrelevant information. Other times, these systems provide information in such large quantities as to be useless to the user. All the while, an expert in the information unbeknownst to the user sits three cubicles down.

Another problem associated with existing knowledge management systems is the vast array of information available to the user, the number of disparate systems in which this information resides, and the sheer quantity of the information itself. Gathering this information, particularly from among the disparate systems, is a formidable task that many existing knowledge management systems do not effectively address.

These and other drawbacks also exist.

SUMMARY OF THE INVENTION

An object of the invention is to overcome these and other drawbacks of existing systems.

Another object of the invention is to provide a system and method for processing knowledge data in an asynchronous manner.

Another object of the invention is to provide a system and method for processing knowledge data in a parallel manner.

Another object of the invention is to provide a system and method for selectively distributing knowledge processing services in a distributed architecture.

Another object of the invention is to provide a system and method for distributing knowledge processing services to primary and secondary servers in a distributed architecture. This object of the invention may include distributing knowledge gathering tasks to a plurality of secondary servers.

Another object of the invention is to provide a system and method for mapping information stored in a data repository to a user having an affinity to such information.

Another object of the invention is to provide a system and method for enabling a user to select one or more data repositories and mapping the information in the selected one or more data repositories to one another, and to one or more persons having affinity to the information.

Another object of the invention is to provide a system and method for determining changes in affinities of one or more persons to the information over a period of time.

Another object of the invention is to provide a system and method for tracking the changes in affinities of the one or more persons to the information and synchronizing the changes with profile data associated with the one or more persons.

Another object of the invention is to provide a system and method for organizing the information or knowledge data based on a user or person's affinity to the knowledge data. This object of the invention may include enabling a user to organize information and persons having affinity to the information in a secured private place in the system. This object of the invention may include enabling a user to organize information and persons having affinity to the information in public or shared places of the system so that other users can access the information.

Another object of the invention is to provide a system and method for communicating with one or more persons having affinity to a desired information.

Another object of the invention is to provide a system and method for enabling a user to search for a desired information using knowledge maps based on a user or person's affinity to the information.

Another object of the invention is to provide a system and method for normalizing the retrieved information content using extensible markup language (XML).

Another object of the invention is to provide a system and method for normalizing documents using XML that provides full-text indexing, categorizing, and metrics extraction.

These and other objects of the invention are achieved according to various embodiments of the invention. According to one embodiment, a system, method, and processor readable medium comprising processor readable code embodied therein are provided that asynchronously process data in a knowledge management system. The system may gather information content from a repository according to a predetermined schedule. The information content may be registered with a K-map. A unique document identifier may be assigned to the information content gathered. A work request regarding information content gathered may be transmitted to a persistent work queue. The persistent work queue may process the work request. The work request processing may include extracting a portion of the document in extensible markup language (XML) format so as to normalize at least a portion of the document contents. Control messages may be transmitted to one or more users providing a status of the work request.

The normalized document may then be transmitted to a processing work queue where additional data processing may occur. The additional data processing may include metrics extraction, full-text indexing, categorization, or other process. After processing is complete, the work queues may generate progress statistics reports that indicate a status of all work requests. The progress statistics reports may be transmitted to a scheduler component via a completion work queue. All system components may share access to a central data structure that represents a metrics history and taxonomy via a CORBA service.

The invention may create associations between users, persons and information resources, personalize and organize knowledge for individuals and communities, and provide a place for teams to work, make decisions, and act. The invention may also create a searchable index, compute document values, and provide a search-and-browse user interface.

These and other objects, features and advantages of the invention will be readily apparent to those having ordinary skill in the pertinent art from the detailed descriptions of the embodiments with reference to the appropriate figures below.

BRIEF DESCRIPTIONS OF THE DRAWINGS

DETAILED DESCRIPTION OF PREFERRED EMBODIMENTS

A system, method, and processor-readable medium for processing data in a knowledge management system is disclosed. The system may asynchronously process data such that multiple processes are performed simultaneously. The system may perform categorization, full-text indexing, and metrics extraction, or other processes simultaneously, such that a repository is maintained with current information.

Figure 1:
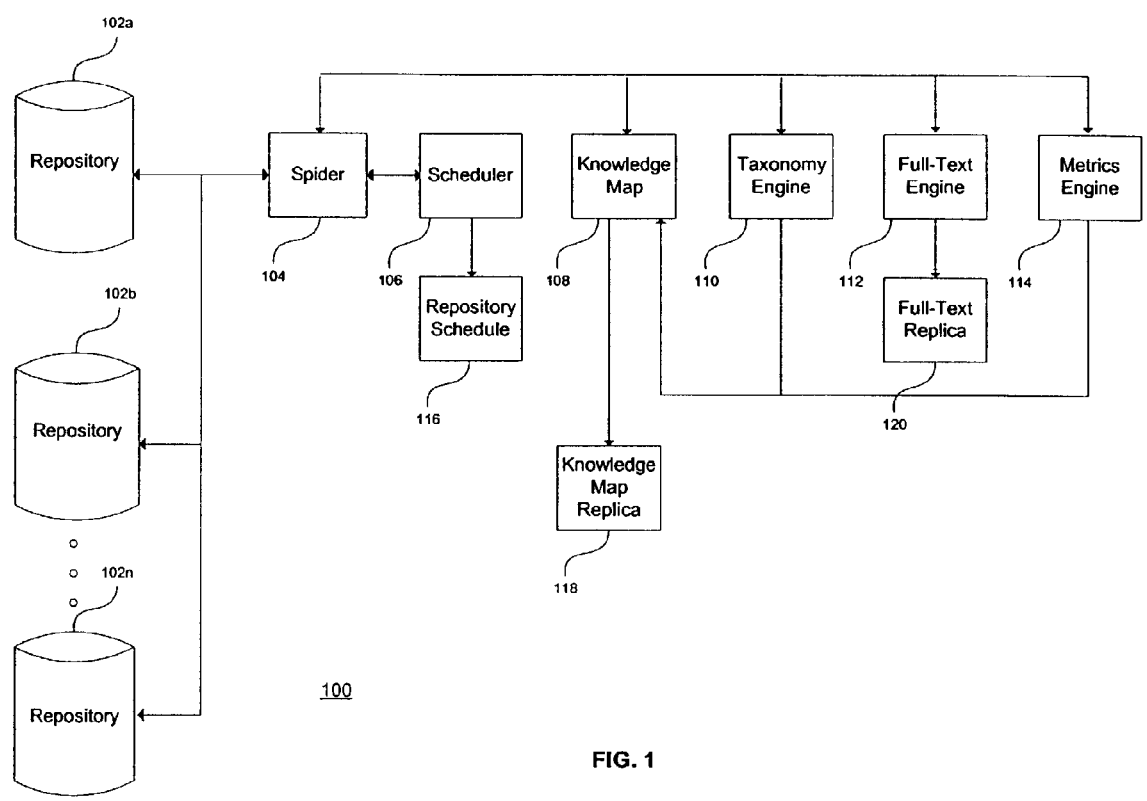
FIG. 1 illustrates a system for knowledge data processing according to one embodiment of the invention.

FIG. 1 illustrates a system 100 for processing data according to one of the embodiment of the invention. System 100 may include one or more repositories 102 (illustrated in FIG. 1 as repositories 102a, 102b, . . . , 102n). Repositories 102 may be in communication with a spider component 104. Spider component 104 explores the information content, or knowledge, included in repositories 102. In one embodiment of the invention, spider component 104 invokes various spider processes, or threads, that asynchronously explore repositories 102.

Different types of spider processes may be designed to extract information content from various types of repositories 102 as would be apparent. Spider component 104 may start any number of spider processes to explore different repositories 102. These repositories may include, for example, Lotus Notes™, Lotus QuickPlace™, Domino.Doc, electronic mail (Lotus Domino™), Web and file systems, etc. In some embodiments of the invention, spider component 104 may start a Lotus Notes™ spider process on one server and a Lotus Notes™ spider process and a file system spider process on another server.

As illustrated in FIG. 1, spider component 104 may be in communication with a scheduler 106, a knowledge map (K-map) component 108, a taxonomy engine 110, a full-text engine 112, and a metrics engine 114. Spider component 104 communicates with K-map 108, taxonomy engine 110, full-text engine 112, and/or metrics engine 114 to update and make available to the user information stored in various repositories 102.

Scheduler 106 provides and spider component 104 receives work requests on a work queue that describe which repositories 102 to process. The work requests may be provided by scheduler 106 on a scheduled basis, such as, for example, an hourly, a daily, a weekly, or other scheduled basis. The work requests may also be dispatched by scheduler 106 on a random basis or as directed by a user. The work requests may also be dispatched by scheduler 106 as needed or as bandwidth exists as would be apparent.

Scheduler 106 may communicate with a repository schedule 116 for determining when a particular process is to be scheduled. Repository schedule 116 may detail a type and frequency of spidering for one or more repositories 102. For example, repository schedule 116 may indicate that repository 102a is to be full-text indexed on a daily basis and repository 102b has a categorization and metrics extraction to be performed hourly.

In some embodiments of the invention, the spider processes occur asynchronously such that an overall K-map 108, representative of all information content stored in various repositories 102, can be generated.

Taxonomy engine 110 may be used to determine categories of information stored in repositories 102. Full-text engine 112 may be used to provide a full-text index of information stored in repositories 102. Full-text engine 112 may communicate with a full-text replica 120 that may be used as a backup for information provided by a full-text engine 112. Metric engine 114 may be used to extract metrics information from information stored in repositories 102. In some embodiments of the invention, taxonomy engine 110, full-text engine 112, and metrics engine 114 may be in communication with K-map 108. In these embodiments, K-map 108 may include a map of all information stored in repositories 102, categories of information stored in repositories 102 (as generated by taxonomy engine 110), a full-text index of information stored in repositories 102 (as generated by full-text engine 112), and metrics information for information stored in repositories 102 (as generated by metrics engine 114).

In some embodiments of the invention, K-map 108, taxonomy engine 110, full-text engine 112, and metric engine 114 operate in an asynchronous manner. This enables each of K-map 108, taxonomy engine 100, full-text engine 112, and metric engine 114 to operate independently of one another and of spider component 104. K-map 108, taxonomy engine 110, full-text engine 112, and metric engine 114 need not rely on one another to perform a particular process. This enables at least some information to be available to users as a result of downtime. Additionally, each of K-map 108, taxonomy engine 110, full-text engine 112, and metric engine 114 may be decoupled and replaced individually, thus reducing development costs and, in an event of a failure, system downtime.

In order to provide robust operation, scheduler 106 may include a protocol that handles a failure or shutdown of spider component 104. The protocol may be used to enable spider component 104 to transmit a context on shutdown to scheduler 106. The context may then be transmitted back to spider component 104 when spider component 104 resumes functioning. This enables spider component 104 to resume processing work requests from an intermediate state. In some embodiments of the invention, information regarding a failure or shutdown and the accompanying context may be transmitted from spider component 104 to scheduler 106 via a completion work queue. In some embodiments, independent work queues exist for each of K-map 108, taxonomy engine 110, full-text engine 112, and metrics engine 114. The system may also be more fault tolerant by separating various functions into various processes that may be run independently.

According to one aspect of the invention, spider processes are the "worker" agents of the system 100. In one embodiment, spider processes may gather documents and the information content included therein from one or more repositories 102, at least some of which may be user selectable. In other embodiments, spider processes may monitor changes, updates or deletions to these repositories 102. The repositories 102 may include, but are not limited to, structured and unstructured relational databases, file systems, object-oriented data bases, email systems, etc. In some embodiments, these repositories 102 may include or otherwise access one or more Web-based data repositories. In other embodiments, these repositories 102 may include or otherwise access one or more non-Web based data repositories. Each repository 102 may include a plurality of supported data types (e.g., Notes databases, file system files, external Web sites). As discussed above, each supported data type (Notes databases, file system files, external Web sites) may have a corresponding customized spider process. According to one aspect of the invention, a user may specify one or more repositories 102 to be accessed by system 100 for spidering. According to another aspect of the invention, system 100 may provide information about where to find repository 102, and in the case of Web sites and file system files, about how many levels to retrieve based on links or subdirectories within repository 102.

According to one embodiment, as mentioned above and as illustrated in FIG. 1A, spider component 104 may include one or more spider processes for scanning and exploring one or more repositories 102. In an exemplary embodiment, once a spider process starts, spider component 104 may use a Notes spider 154 to explore one or more Notes databases 164, a File System spider 156 to explore one or more file system repositories in a network 166, a Web spider 158 to explore one or more Web-based databases 168, a Profile Source spiders 160 to explore one or more user profile databases 170, an e-mail spider 162 to explore one or more electronic mail databases 172, etc. In embodiments where a user may specify one or more repositories 102 to be spidered, spider component 104 may determine the type of spider process (e.g., a Notes spider) required in order to scan and retrieve information content from documents stored in the user specified repository. In some embodiments, spider component 104 may retrieve a list of documents that are new or have been altered since the last time the repository was spidered.

According to other embodiments of the invention, spider processes, in addition to various other components of system 100, are distributed over various processors, (e.g., servers, etc.). For example, a first server may include a one or more types of spider processes (e.g., a Notes spider 154 and a Web spider 158) enabled thereon, while a second server may include one or more types of spider processes that may be the same or different from those of the first server (e.g., a Profile spider 160 and a file system spider 156). In one embodiment, any number of spiders may be running concurrently on a given server, dependant of course, on the processing capabilities of the given server.

According to one embodiment of the invention, spider component 104 may gather information content relevant to a user's subject matter of interest from one or more non-Web databases (e.g., LotusNotes database) in a network. In some embodiments, a user may specify which database to monitor and how often information content needs to be gathered therefrom.

In an embodiment employing, for example, a Notes spider 154, Notes spider 154 may select a list of documents for spidering from the user-specified databases (e.g., Lotus Notes database 164). The list of documents selected for spidering may be passed to a conversion function that may investigate each document, convert the contents of each item to XML, and then may pass the XML output back to Notes spider 154. Notes spider 154 may then pass the XML to the work queues for the various system components including, for example, the K-map Building, K-map Indexing, and Metrics services.

According to another embodiment employing, for example, a File System spider 156, File System spider 156 may walk the directory tree recursively on the path on a networked drive in one or more networked File System databases 166. For each file encountered, File System spider 156 may check a modified date against that included with the context stored in File System database 166. In some embodiments, if the file is new or modified, File System spider 156 may pass the file to the XML converter, which may investigate the file and read and convert its contents to XML as necessary. The returned XML output may then be forwarded to the output queues as with Notes spider 154.

According to an embodiment employing, for example, a Web spider 158, a Web spider 158 may traverse a Web server by processing links, parsing each HTML document and traversing all contained links. In some embodiments, Web spider 158 may retain additional state information to prevent redundant processing of URLs. In one embodiment, Web spider 158 may access one repository per a traversal. In another embodiment, Web spider 158 may include a well-defined traversal model and APIs that may move the spider to the next document to process. Each document may be unique, may only exist in one place, and in some embodiments, may be traversed once. In one embodiment, Web spider 158 may gather information content relevant to a user's subject matter of interest (i.e., user's affinity to a subject matter) from one or more Web sites or Web pages (e.g., on-line discussion sites relevant to user's subject matter). In some embodiments, a user may specify one or more Web pages to monitor and how often subject matter needs to be gathered.

According to an embodiment employing, for example, a Profile Source spider 160, a Profile Source spider 160 may process the authoritative directories and supplemental sources for new and updated user documents and records of one or more databases including, for example, a user profile database 170. In some embodiments, system 100 may work in conjunction with a Profile Synchronization service to populate and refresh profile database 170 where system 100 user' profiles may be maintained. The Profile Source spider 160 may gather information about individuals from various sources, including, for example, Domino directory databases and LDAP (Lightweight Directory Access Protocol) server-compliant directories.

According to another embodiment employing, for example, an e-mail spider 162, an e-mail spider 162 may access, for example, e-mail contents of one or more e-mail databases 172 (e.g., electronic mailing groups of an organization). In some embodiments, e-mail spider 162 may gather e-mail subject matters relevant to users using system 100 from one or more e-mail databases. For example, information content of email in e-mail database 172 may provide relationship information (i.e., affinities) between individuals and subject matter, but this information content may not otherwise be published through other services in system 100. When scheduled, e-mail spider 162 may connect to the specified e-mail database and examine all sent and saved mail. Information from fields such as author, from, to, copy to, subject, and body may be extracted and converted to XML using the process just described. E-mail XML may be forwarded to the metrics queue where metrics engine 114 may evaluate the information content therein to determine relationships to existing K-map category areas. In one embodiment, e-mail content with no relationship to K-map category areas may be ignored.

According to one aspect of the invention, spider component 104 may receive input from a work queue populated by requests from the scheduler 106. When spider component 104 is active, it may check the work queue for a repository 102 to process. Besides this output, spider processes may also write status information to the completion queue.

According to one embodiment of the invention, scheduling information for each repository is maintained in a database. This schedule database indicates a schedule for spidering each repository as well as information about the type of the repository, its location, etc. When the schedule indicates that a database is to be spidered, scheduler 108 puts a work request onto the spidering queue associated with the spider process that will do the work. When an appropriate spider process becomes available, the spider process removes the work request from the queue and begins spidering the repository. In particular, the spider process reads new or changed documents from the repository in their native form, normalizes them to the internal XML form and then places them onto a work queues associated with each of the processing components (e.g., full-text indexing, taxonomy building, metrics, etc.). A single completion queue may also be used to which spider processes and processing components post progress messages. Scheduler 106 reads messages from this completion queue and writes logging information to various databases recording progress statistics, error conditions, warnings, etc.

Figure 1A:
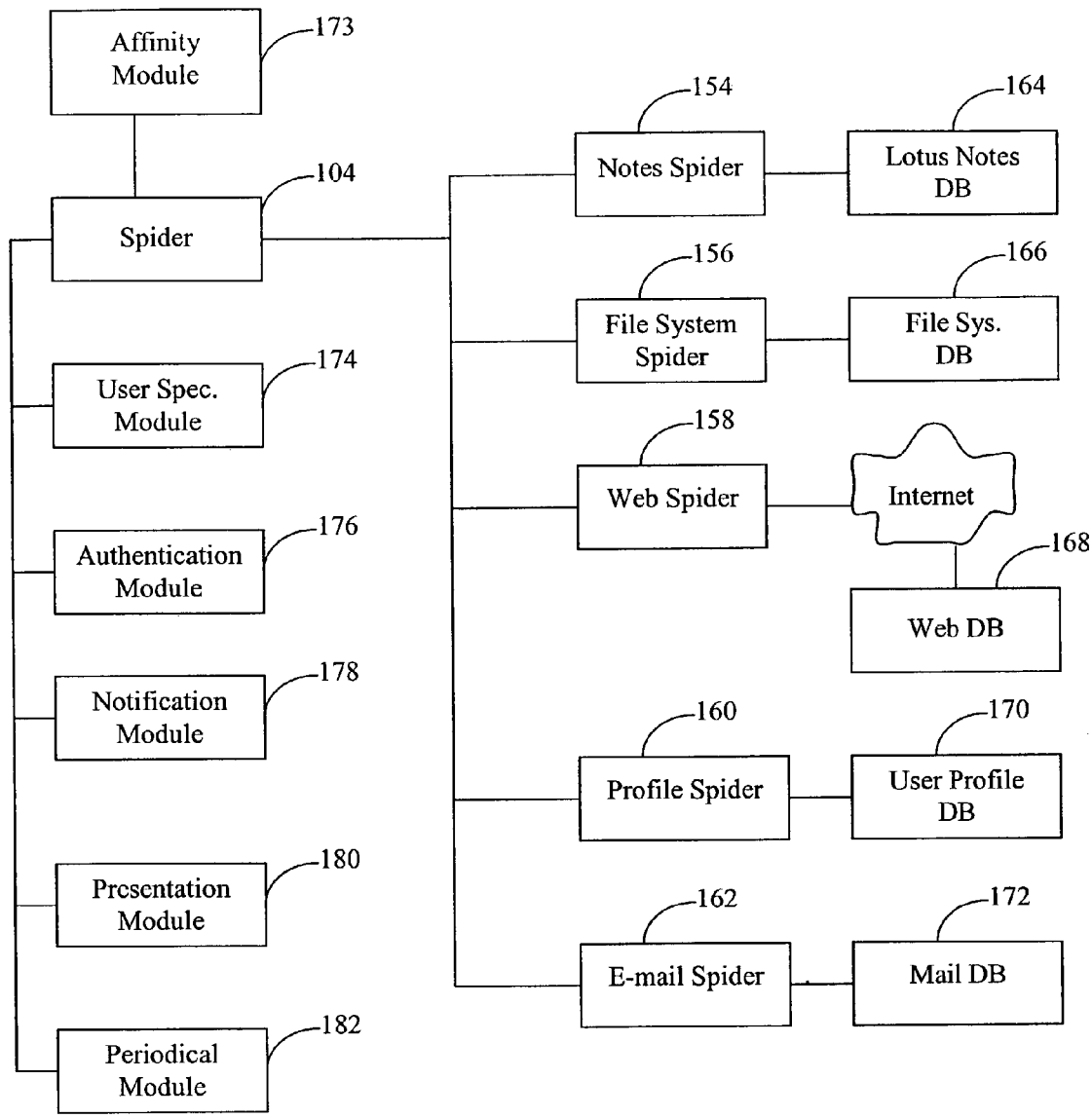
FIG. 1A illustrates a knowledge gathering system according to one embodiment of the invention.

As illustrated in FIG. 1A, spider component 104 may include, for example, an affinity module 173, a user-specification module 174, an authentication module 176, a notification module 178, a presentation module 180, and a periodical timing module 182.

According to one aspect of the invention, a user may specify a plurality of features for selecting data repositories 102 for spidering using user specification module 174. These features may include, but are not limited to, a maximum size of document to process, a specific type of document to include or exclude (e.g., include jpg files, exclude jar files, etc.), a domain(s) or data source(s) to limit spidering (e.g., acme.com Web site, sales forecast directory of intranet, etc.).

According to another aspect of the invention, spider component 104 may include authentication module 176. Authentication module 176 may include authorizations for one or more spider types (e.g., Web spider 158) to access a variety of repositories including of Web-based and non-Web-based data repositories 102. Spider component 104 may adhere to source-level security and may be considered good "net citizens." Spider component 104 may report back, via system 100, if it cannot access certain sources because of security restrictions. Spider component 104 may extract information from documents including, but not limited to, author, usage, content, security, source location, etc. Spider component 104 may also extract Unicode settings to determine a native language of the source documents. Spider component 104 may register each document in a database. As each XML document is identified, the database may return a unique 16-character identifier for the document and all associated information obtained through subsequent Discovery Server processes. The unique identifier may be used to reference the metadata stored in the K-map about that document when other modules or the user interface needs to retrieve it. The unique identifier may be assigned based on a certain collection of meta-data about the document that uniquely identifies the document in the information system. If the document is reprocessed by the system because of changes, the same unique identifier may be used to refer to the document throughout the system. Unique identifiers are generally not reused; however, they may not necessarily be universally unique as separate instances of the system could potentially generate the same identifiers for different documents. After registration, the XML documents may be passed back to spider component 104, which then transfer the XML output to system 100 work queues (e.g., metrics, K-map builder, and K-map indexing).

In an exemplary embodiment of the invention, as illustrated in FIG. 1A, system 100 may include an affinity module 173 that may intelligently understand a user's subject matters of interest. In general, affinities are relationships between a person and categories of knowledge that are based on the observed history of the person's activities with documents that have been assigned to those categories. The metrics subsystem collects the history of the person's activities with documents from the document metadata produced by the spiders and records a history of these actions in the metrics database. Some of the actions that may be recorded are, authoring documents, responding to documents, linking to documents, modifying documents, reading documents, or other interaction with documents. Later, an affinity may be computed by accruing a weighted sum of a number or value assigned to each of these actions for each {person, action, document, category}, or "tuple." This weighted sum creates a score which relates each person who had actions with a document to the categories to which that document has been assigned. The weights applied may be adjusted to reflect an organization's pattern of document usage. For example, in one embodiment, the action of authoring a document may be given a high weight because document creation may be the clearest indication of production and capture of knowledge. However, in other embodiments, where content typically comes from external sources, the amount that a person has read might be a better indication of knowledge, so the relative weight of reading might be adjusted to be greater or equal to that of authoring. Other weighting schemes may be used as would be apparent.

Spider component 104, using one or more of the types of spiders, may monitor one or more databases (e.g., Lotus Notes database 164, Web database 168) and may gather therefrom, information relevant to the user's affinity to the document included therein.

In some embodiments, people may be notified that the system has computed an affinity for them when, for example, an affinity score rises above a predetermined threshold. For example, in one embodiment of the invention, this threshold may be expressed as a score greater than that of a certain percentage of the population of people who have affinity scores. In some embodiments, this notification may have two purposes. First, it may allow the person to correct the system by declining to have the affinity published, for example, when the person is listed as the author of content based on its metadata, but is not actually the originator of the content. Second, it may allow the person to recognize that a particular category exists in the K-map thereby introducing them to other documents in that category and to other people who have affinities for that category. The affinity may also be published in the profile document about that person so that people searching for "people who know about" a topic can find this person's affinity and thereby link to the category, the documents and the other people.

Notification module 178 of system 100 may notify the user that information content relevant to the user's affinity has been gathered. In some embodiment, notification module 178 may notify the user that an update of information content relevant to the user's affinity has been gathered. Upon the user's approval, presentation module 180 may present the gathered information content. In some embodiments, the system 100 may determine one or more categories for the information content and store them for further processing.

According to one embodiment of the invention, a dedicated server may run all services (e.g., profile source spidering, k-map building, etc.) of the system 100. According to another embodiment of the invention, as illustrated in FIG. 1B, services of the system 100 may be performed in a distributed environment.

Figure 1B:
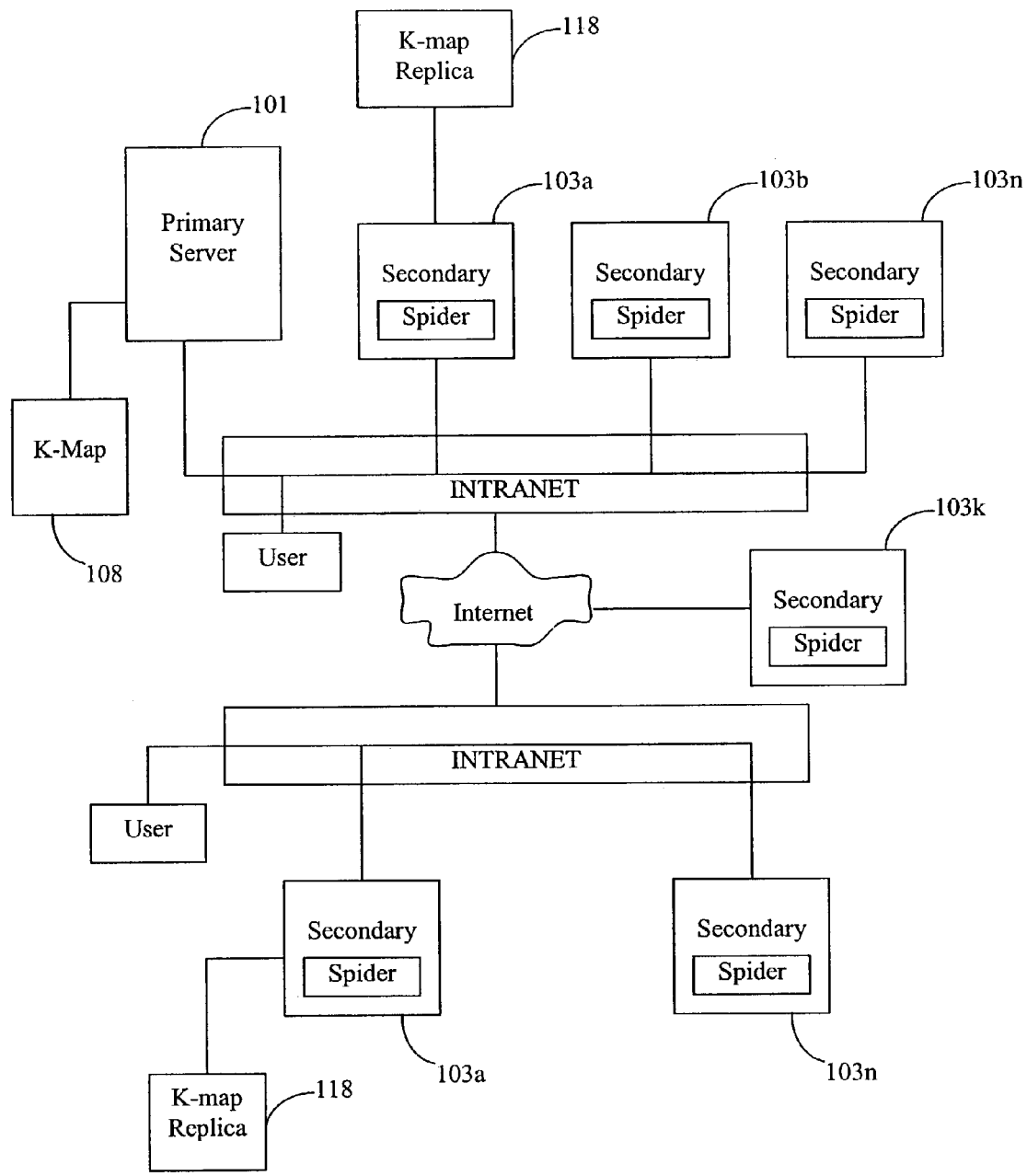
FIG. 1B illustrates a distributed system for knowledge data processing according to one embodiment of the invention.

According to another embodiment of the invention, system 100 may include one primary server 101, and a plurality of secondary servers 103 (illustrated as various secondary servers 103a-n in FIG. 1B). In some embodiments, a plurality of secondary servers 103 may be distributed within an intranet. In some embodiments, a plurality of secondary servers 103 may be distributed remotely through internet (i.e., distributed across a plurality of intranets through internet). In one embodiment, a plurality of secondary servers 103 may be distributed in a combination of intranet and internet. In some embodiments, one or more standalone secondary servers 103 may be accessed via the internet.

In one embodiment, system 100 may include one primary server 101 and a plurality of secondary servers 103 for knowledge data processing. In this embodiment, primary server 101 may host metrics engine 114 to process the data from the documents in one or more user selectable data repositories 102. This may ensure that primary server 101 is fully available for user access. If this primary server 101 is overloaded with user tasks, then additional secondary servers 103 may be deployed with K-map replicas 118 to distribute the user load.

According to various embodiments, K-map 108 may be replicated at both primary server 101 and one or more of secondary servers 103. Replicating the K-map 108 improves server performance by reducing user demand on primary server 101. Primary server 101 may still be used for K-map 108 processing since K-map replicas 118 on secondary servers 103 may require access to the primary server to communicate user interaction with documents that are metrics-related. In some embodiments, to make the K-map browsing faster for users on a remote intranet, another secondary server 103 with K-map replication on, for example, the remote intranet may be used.

In one embodiment of the invention, because various types of spiders utilize the same system resources (e.g., network and disk I/O), one or more types of spider processes (e.g., Notes spider 154, Web spider 158, etc.) may be distributed over a plurality of secondary servers 103. For example, Notes spider 154 may be distributed over a plurality of secondary servers 103 for load balancing. In another example, Notes spider 154 and Web spider 158 may be distributed over a plurality of secondary servers 103.

Distributing spider processes across secondary servers 103 enables efficient processing of knowledge because spiders typically work on one repository (e.g., repository 102a) at a time, continuing on to the next repository as indicated in their queue only after they finish processing the prior repository. If one type of spider is dedicated to one server, the system 100 may take longer to spider all user specified repositories (e.g., repository 102a-n).

In some embodiments, primary server 101 may perform metrics collection using metrics engine 114. A first secondary server 103a may perform, for example, profile source spidering from user profile database 170, profile synchronization using a profile synchronization module (not otherwise illustrated), and profile maintenance using a profile maintenance module (not otherwise illustrated). A second secondary server 103b may perform, for example, metrics processing using a metrics processing module (not otherwise illustrated), and K-map building using taxonomy building engine 110. Other distributions of these tasks may be utilized across any of servers 101, 103 as would be apparent.

In some embodiments, affinity processing using affinity module 173 and notes spidering using notes system spider 154 may be performed in a dedicated secondary server. In some embodiments, a remote secondary server 103k coupled to primary server 101 through the internet may be used for web spidering. In some embodiments, a secondary server hosting the Full Text Index may be coupled to a local intranet associated with primary server 101 for performance reasons.

On a multi-processing server, a user may configure a plurality of spider processes to operate thereon, if the user requires additional utilization of the servers that are spidered. This takes advantage of latency in the network and the servers 101, 103, and the distribution of content across the plurality of secondary servers 103. Because only a limited amount of bandwidth is available to each server, and because not all repositories 102 respond instantly to requests for content, the use of that bandwidth can be maximized by spidering multiple repositories at the same time.

In some embodiments, if system 100 includes a repository 102 (e.g., a Notes Database 164) on a remote network that is selected for spidering, a local replica of this repository 102 may be used to reduce network traffic as would be appreciated.

In some embodiments, a high performance network adapter (e.g., 100 Mbit or faster) may be used in the servers 101, 103 of the system 100. Each server of the system 100 may include two network interface cards (NICs), one for LAN connection and one for backup system connection as would be apparent.

In some embodiments, each server of the system 100 may include two or more instances of a particular service enabled for every CPU available in the server because every service instance may process only one repository at a time. For example, if Notes spider 154 and Web spider 158 are run on a 4-way server, the system may include, for example, 8 concurrent Notes spiders and 8 concurrent Web spiders 158 enabled to spider data repositories on that server.

Figure 1C:
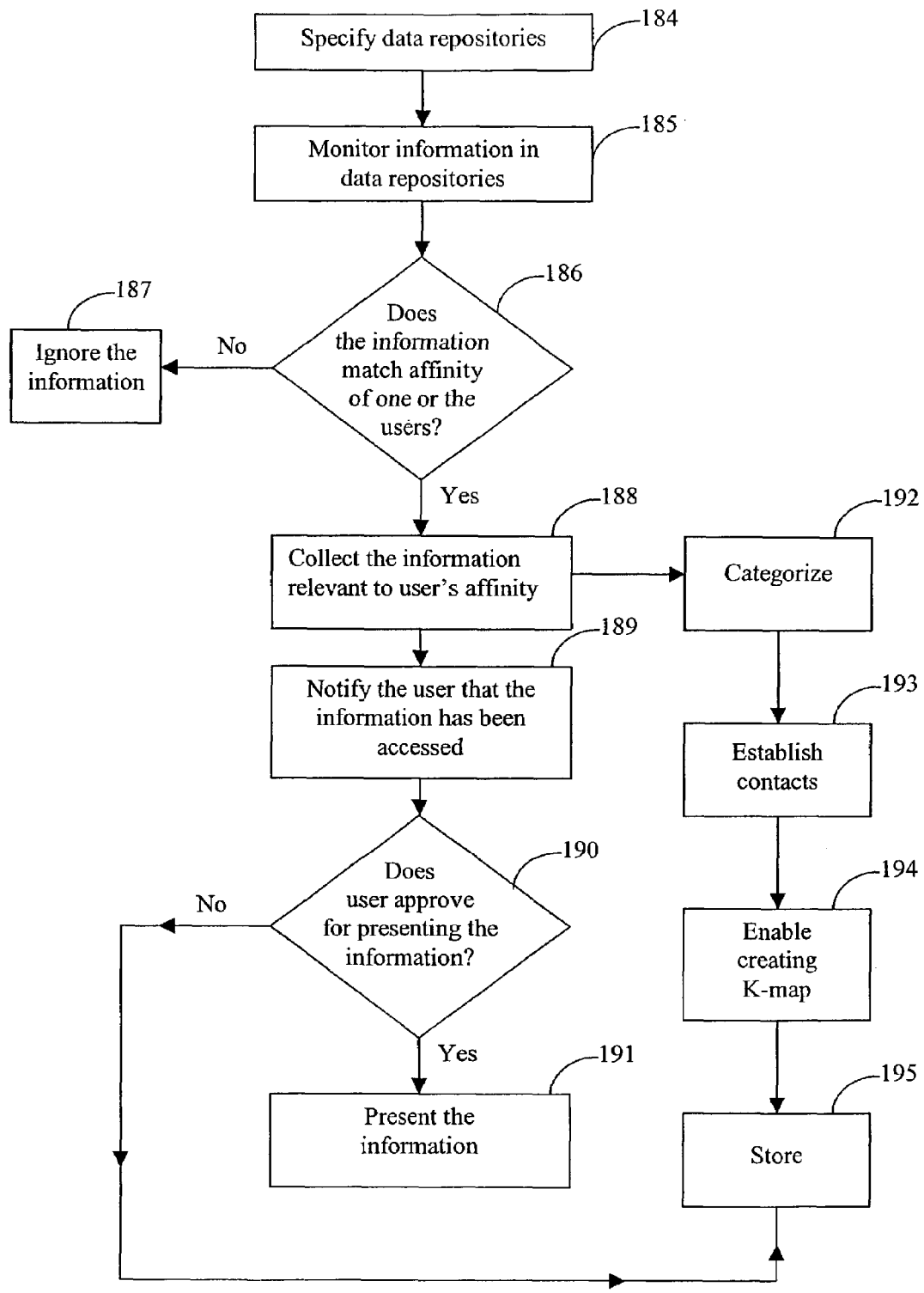
FIG. 1C illustrates a method of gathering information for knowledge data processing according to one embodiment of the invention.

According to one embodiment of the invention illustrated in FIG. 1C, in an operation 184, a user may specify one or more repositories 102 from which information for knowledge processing should be gathered. In an operation 185, spider component 104 monitors information content in the one or more user specified repositories. In a decision operation 186, spider component 104 may determine whether the information content in the user specified repositories matches or otherwise corresponds to one or more user affinities. If there is no match or other correspondence, in an operation 187, spider component 104 ignores the information content. If there is a match or correspondence, in an operation 188, spider component 104 gathers the matching information content. In some embodiments, the match or correspondence determination may be performed by various known character matching algorithms. In other embodiments, the match or correspondence determination may be performed by various known text matching algorithms. In one embodiment, spider component 104 may determine a context match for the matching information to the one or more user affinities before gathering the matching information (not otherwise illustrated). In an operation 189, spider component 104 may then notify the user that the information content matching or relevant to the one or more user affinities has been accessed. In an operation 190, the user may approve or disapprove the presentation of the information content by spider component. If approved, in an operation 191, spider component 104 may present the information. If disapproved, in an operation 195, the information content may be stored for future presentation.

According to another embodiment, in an operation 192, system 100 may categorize the gathered information content into one or more categories using one or more categorizing algorithms. In some embodiments, in an operation 193, the gathered information content may be further categorized by establishing contexts of the gathered information content to one or more categories. In an operation 194, the gathered information content may be added to a K-map in system 100. In an operation 195, the gathered information content may be stored in the system 100 for subsequent searching.

Figure 2:
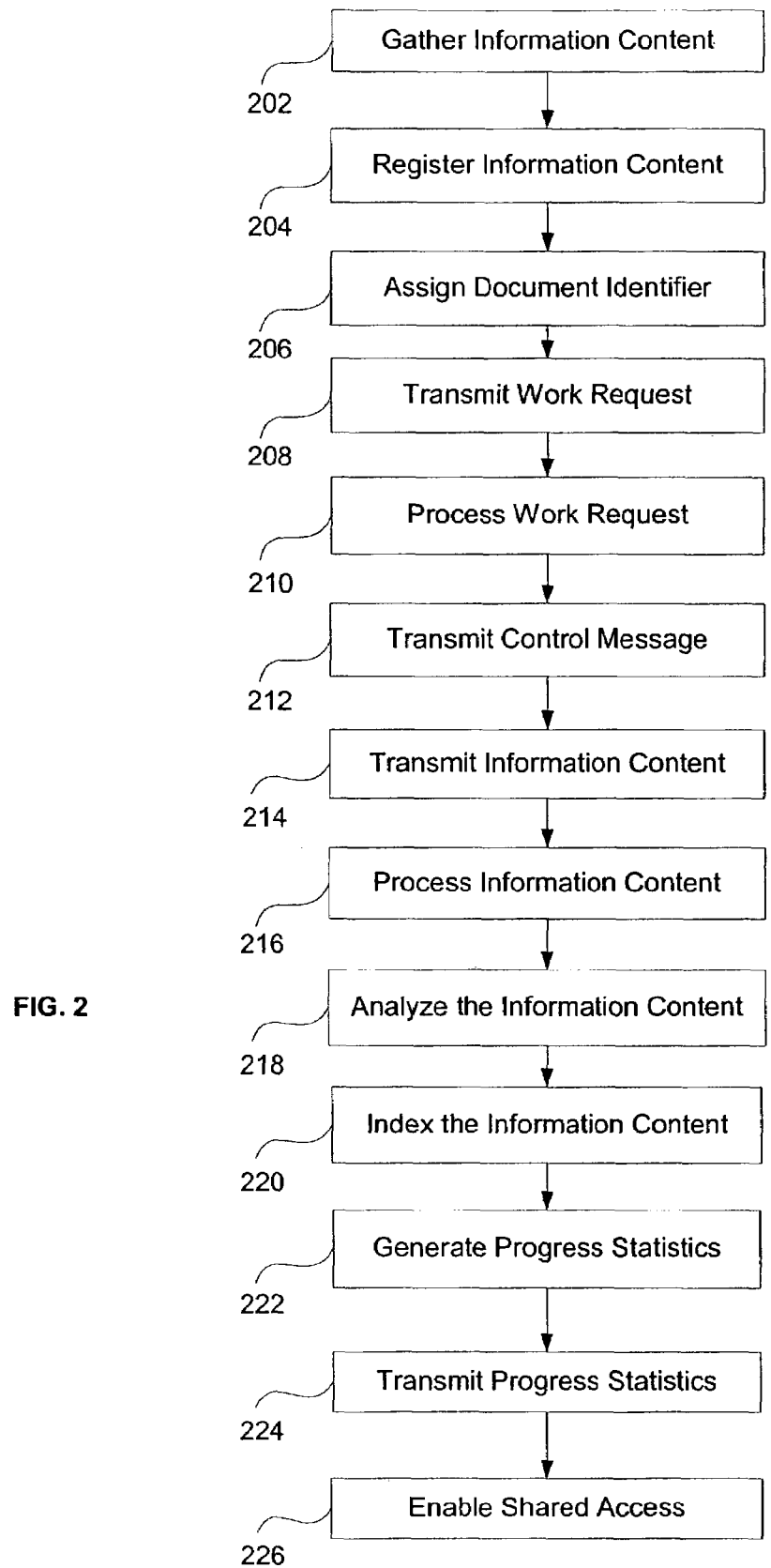
FIG. 2 illustrates a method for knowledge data processing according to one embodiment of the invention.

FIG. 2 illustrates a method for processing data in a knowledge management system 100 according to one embodiment of the invention. In an operation 202, information content may be gathered for data processing by a spider component 104. In an operation 204, spider component 104 may register the information content gathered with a K-map. In an operation 206, the K-map may assign a unique identifier to the gather information content. In an operation 208, spider component 104 may transmit work requests to, for example, a taxonomy engine, a full-text engine or a metrics engine, regarding the gathered information content. The one or more engines may use the unique identifier to refer to the information content gathered. The unique identifier may be a part of an extensible markup language (XML) meta-document representation (described in further detail below) that may be transmitted to system users.

In an operation 210, the work requests are then processed. The work request, may be, for example, to process the repository from which the information content is gathered and to convert documents stored in the repository into a standard meta-document representation in XML format. The process of converting the document into a standard meta-document is described in further detail below with reference to FIG. 4.

In an operation 212, spider component 104 may transmit control messages to system users advising of a start and finish of a work request. In some embodiments of the invention, the control messages do not include any XML content. In an operation 214, the meta-document representations may then be transmitted to a designated module for predetermined processing. These modules may include a K-map, taxonomy engine, full-text indexing engine, and/or a metrics engine. In an operation 216, the modules may process the meta-documents. The processing of the meta-documents may vary depending on the module performing the processing. For example, a K-map may generate a map of the information content stored in a repository. A taxonomy engine may assign the information content stored in a repository to certain categories. A full-text indexing engine may generate a full-text index for information content stored in a repository. A metrics engine may extract metrics information from the information content stored in their repository and store only the metrics information. These processes may be performed asynchronously such that each module operates independently from one another, thereby performing processes in a parallel manner. In this manner, a greater amount of information content in a repository is made available to users at least because the knowledge management system has less downtime for processing information content stored in a particular repository.

In an operation 218, after being processed, the meta-documents may be analyzed. The analysis may be performed, for example, to determine a type of information content stored in a repository. In an operation 220, the meta-documents may also be indexed.

In an operation 222, progress statistics may be generated for each of the processes. The progress statistics may be presented in one or more reports and generated by a spider component and a work queue. In an operation 224, the progress statistics may be transmitted to a scheduler component 106 via a completion work queue. Scheduler component 106 may read the progress statistics and update any corresponding statistics in a repository schedule. Scheduler component 106 may also update a log database with any warnings or errors generated by a work queue. In an operation 226, each module may then be enabled with shared access to a central data structure representing the metrics history and taxonomy or other information via, for example, a CORBA service.

Figure 3:
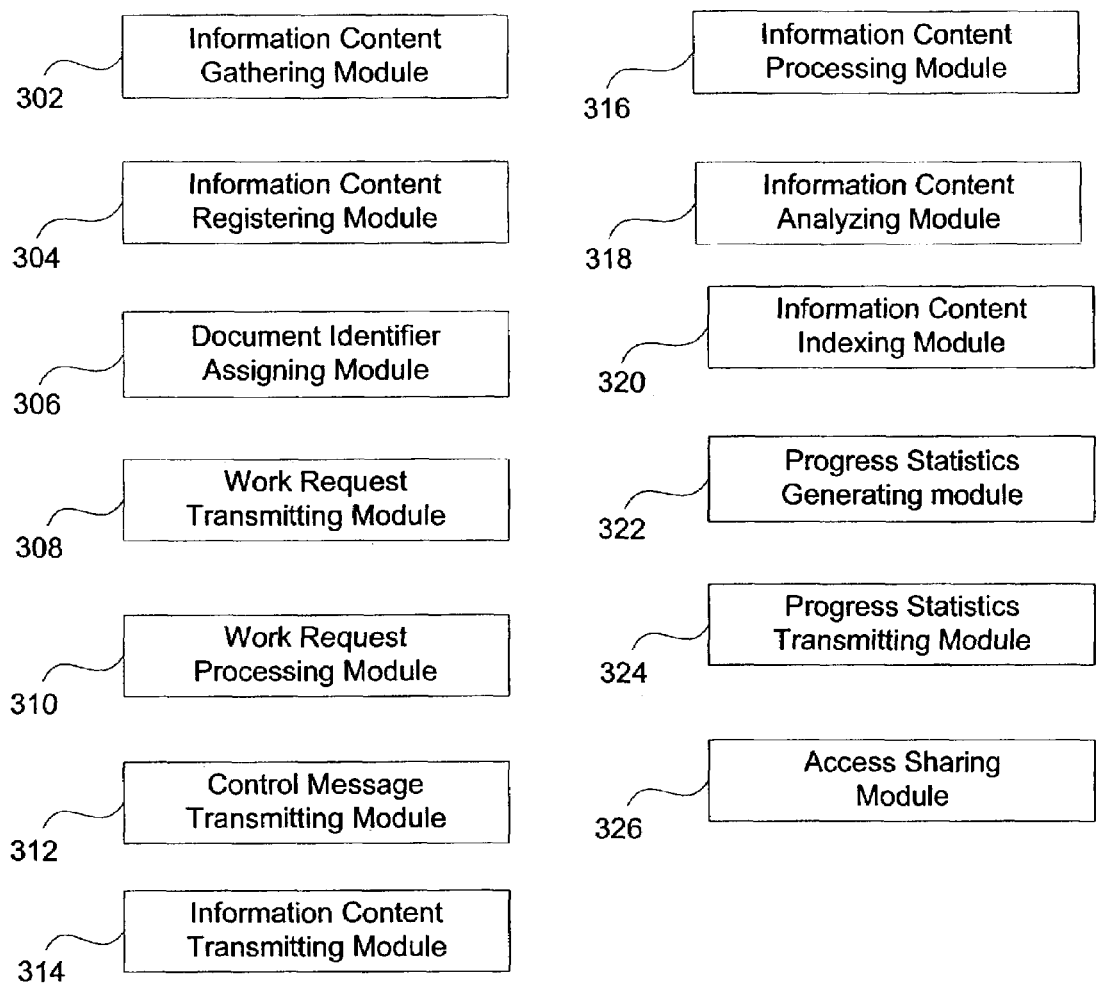
FIG. 3 illustrates a modular system for knowledge data processing according to one embodiment of the invention.

FIG. 3 illustrates a system for processing data in a knowledge management system 100 according to one embodiment of the invention. The system may include an information content gathering module 302, an information content registering module 304, a document identifier assigning module 306, a work request transmitting module 308, a work request processing module 310, a control message transmitting module 312, an information content transmitting module 314, an information content processing module 316, an information content analyzing module 318, an information content indexing module 320, a progress statistics generating module 322, a progress statistics transmitting module 324, and/or an access sharing module 326.

Information content gathering module 302 may be used to gather information content from one or more repositories 102 based on a repository schedule. The repository schedule may identify a type and frequency with which to gather the information content. Information content registering module 304 may be used to register the information content gathered with, for example, a K-map. Document identifier assigning module 306 may then assign one or more unique document identifiers to the information content gathered. These document identifiers may be used by, for example, other modules for retrieving and identifying the information content.

Work request transmitting module may transmit a work request regarding the gathered information content to a persistent work queue. The work requests may then be processed for the repository from which the information content was gathered using work request processing module 310. Work request processing module 310 may convert documents stored in a repository into a standard meta-document representation in extensible markup language (XML). Control message transmitting module 312 may be used to transmit control messages to one or more users that provide a status regarding work requests. The control messages may identify a start and/or finish of a work request or other information.

The meta-documents may then be transmitted to a processing work queue for further processing by information content transmitting module 314. The processing may be, for example, full-text indexing, categorization, metrics extraction, or other process. The documents may be processed using information content processing module 316.

After processing the meta-documents, the meta-documents may be analyzed by information content analyzing module 318. This analysis may include determining a type of information stored in the repository. The meta-documents may be indexed using information content indexing module 320.

Progress statistics regarding the processes performed on the gathered information content may be generated using progress statistics generating module 322. These progress statistics may be generated in one or more reports. The progress statistics may be transmitted to other components in a knowledge management system using progress statistics transmitting module 324. Various components within the knowledge management system may be provided with shared access to a central data structure representing the metrics history and taxonomy of the information content via a CORBA service using access sharing module 326.

Figure 4:
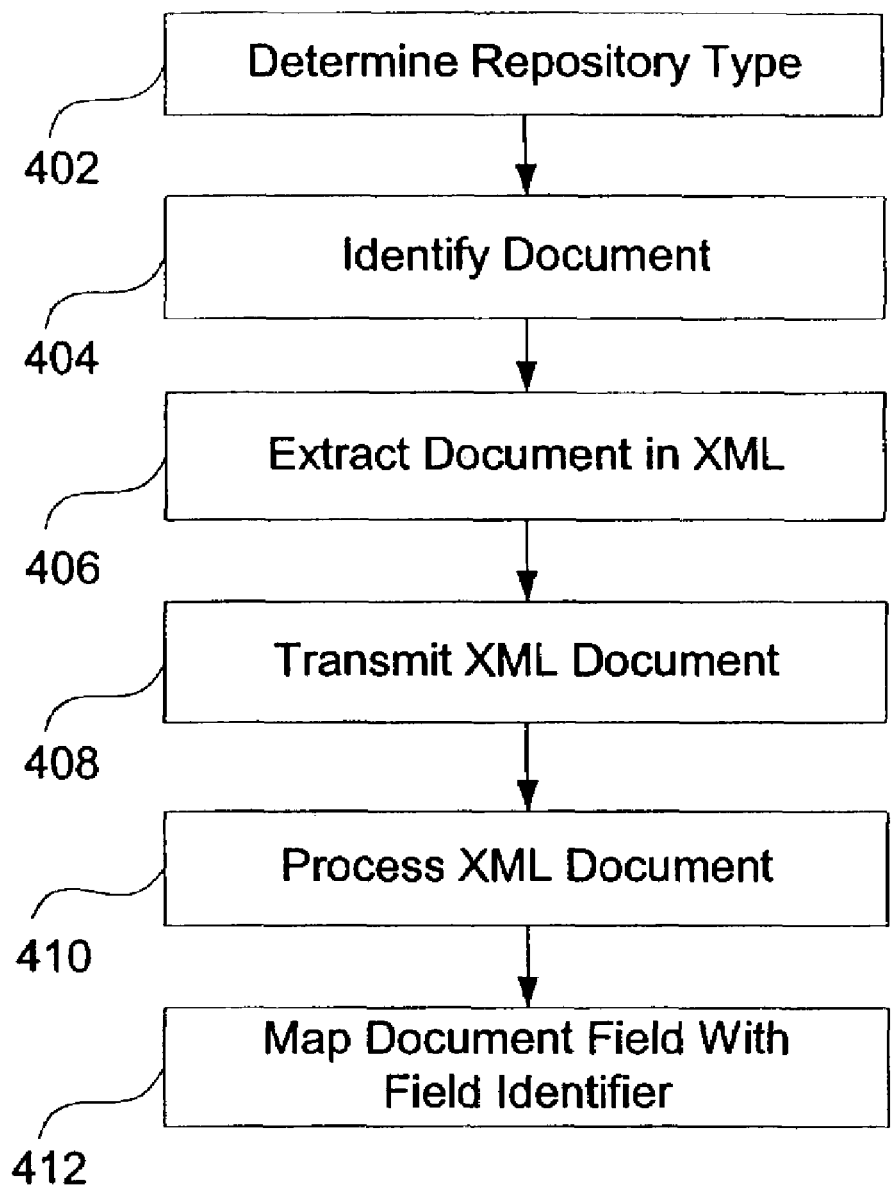
FIG. 4 illustrates a method for normalizing documents in XML format according to one embodiment of the invention.

FIG. 4 illustrates a method for processing a work request according to one embodiment of the invention. In an operation 402, a work request may be processed by determining a repository type from which information content is gathered. In an operation 404, the document may then be identified. In an operation 406, the document may then be extracted from the repository in XML format. In some embodiments, a document may be extracted based on a user's affinity to the document. The document extracted may be a meta-document. The meta-document may include metrics information from the document. For example, the document may include author, title, subject, date created, date modified, list of modifiers, links list information, and other information.

In an operation 408, the meta-document may be transmitted to a work queue for further processing. In an operation 410, the meta-document may then be processed according to a predetermined process for the work queue. The work queue may, for example, categorize, full-text index, or perform other processes on the meta-document.

In an operation 412, fields within the meta-document may be mapped with a field identifier. For example, an author of a document may be mapped with an author field, a creation date may be mapped with a date created field, a title may be mapped with a title field, and other metrics information may be mapped with a corresponding field designation identifier.

Figure 5:
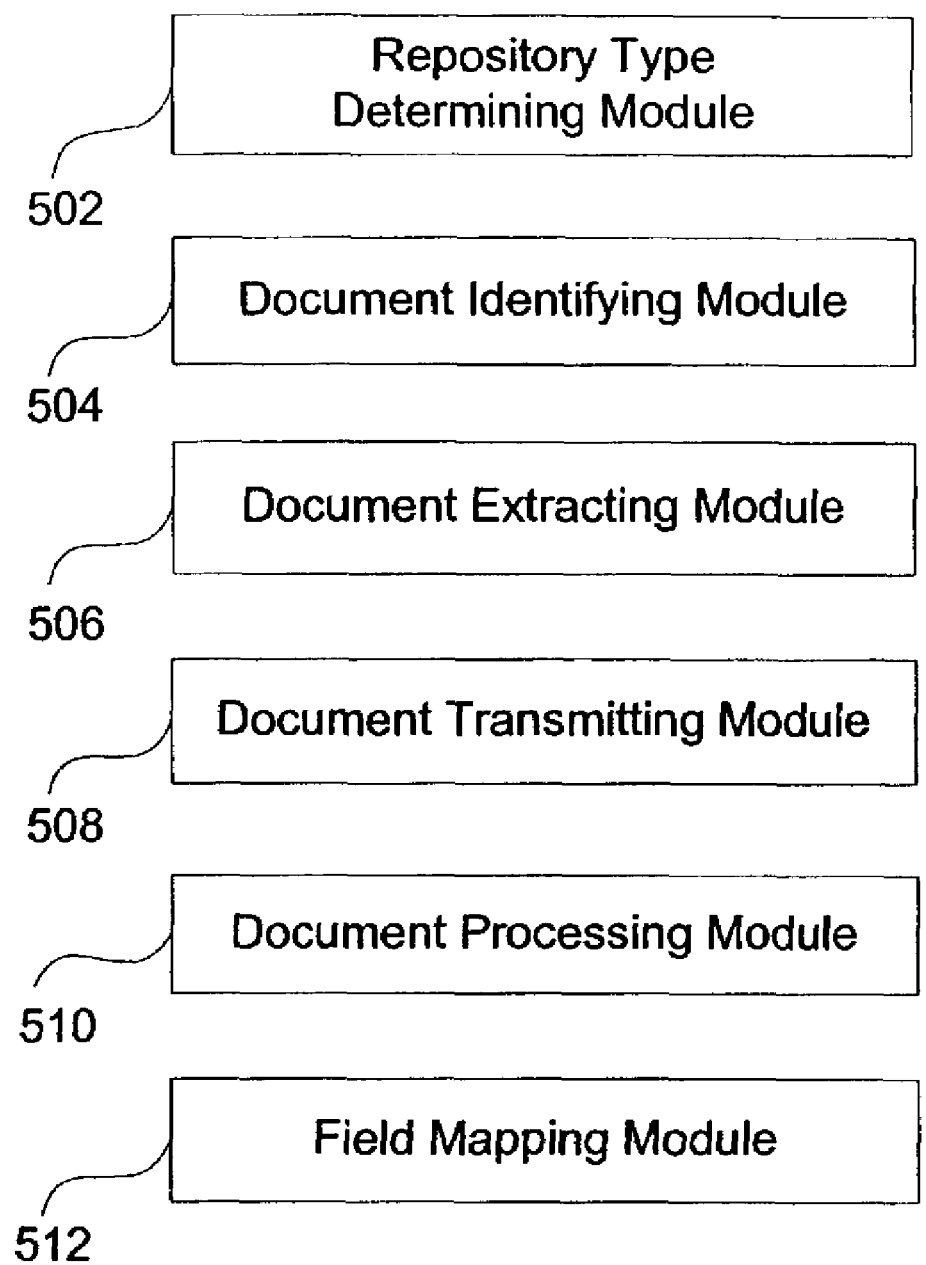
FIG. 5 illustrates a system for normalizing documents using XML according to one embodiment of the invention.

FIG. 5 illustrates a system for processing a work request according to one embodiment of the invention. The system may include a repository type determining module 502, a document identifying module 504, a document extracting module 506, a document transmitting module 508, a document processing module 510, and/or a field mapping module 512.

Repository type determining module 502 may determine a repository type from which a document is to be retrieved. Document identifying module 504 may identify the document to be retrieved from the repository. Document extracting module 506 may extract the document from the repository. Document extracting module 506 may also convert the document into a standard meta-document representation in an XML format. The meta-document may include meta-data regarding the document. For example, the meta-document may include, but is not limited to, author, title, subject, date created, date modified, list of modifiers, linked list information, etc.

The meta-document may then be transmitted to a work queue for processing using document transmitting module 508. The meta-document may then be processed according to a process designated for a particular work queue using document processing module 510. The processes may include, for example, categorization, full-text indexing, metrics extraction or other process. Field mapping module 512 may be used to map fields in the meta-document with a field designation identifier. For example, author, title, and subject information may be mapped with an author field, title field, and subject field, respectively. Other fields may also be mapped as would be apparent.

According to one aspect of the invention, a K-map represents the cataloged knowledge within a particular entity (i.e., organization, building, group, area of expertise, etc.) enabling users to search and browse a wide range of knowledge assets from one convenient place. K-map module 108 provides context by enabling the user to see People, Places, and Things in relationship to categories and each other. The system 100 provides support for creating and maintaining the K-map that users can access in order to find relevant information and expertise.

Figure 1D:
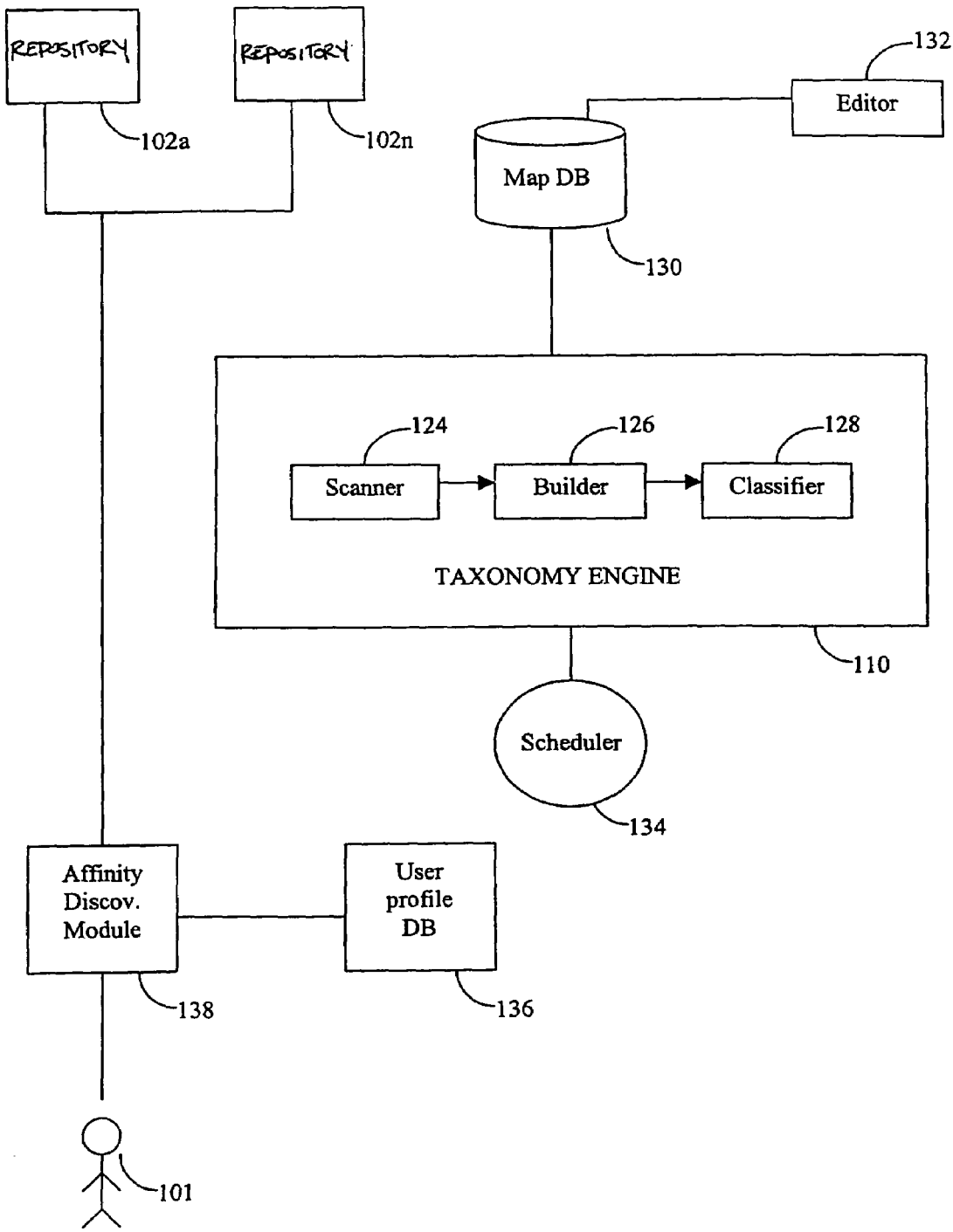
FIG. 1D illustrates a system for knowledge mapping according to one embodiment of the invention.

According to one embodiment of the invention illustrated in FIG. 1D, the K-map is created by taxonomy engine 110, and stored in a map database 130. In various embodiments, taxonomy engine 110 may be coupled to a user profile database 136. Relationships, for example affinity, of users to contents of the documents stored in repositories 102 may be stored in user profile database 136. An affinity discovery module 138 functions to monitor the activities of a user 101 to determine the subject matters (i.e., categories) for which user 101 appears to have an affinity, determines the strength of the affinity for each determined category, and assigns an affinity value to the determined affinity. As an example, affinity discovery module 138 may be operable to access an e-mail system (not otherwise illustrated) to examine the e-mails sent to and from user 101 and may be operable to access one or more repositories 102 to examine the documents authored or viewed by user 101. For example, if user 101 has recently authored and viewed several documents associated with the category of "computer security," then affinity discovery module 138 will determine that user 101 has some affinity for "computer security" based on these activities. Additionally, affinity discovery module 138 may assign an affinity value based on the strength of user 101's affinity for the category.

After affinity discovery module 138 determines that user 101 appears to have an affinity for a particular category and assigns an affinity value to the affinity, affinity discovery module 138 submits the affinity to user profile database 136 for storage.

According to another embodiment, taxonomy engine 110 may also include a scanner 124, a builder 126, and a classifier 128. Scanner 124 may scan the extracted data from the XML document retrieved from the appropriate work queue. In one embodiment, scanner 124 may, for example, compare a document (e.g., an XML document) against word lists of a predefined "stopwords" file on the system 100. The stopwords file includes words that are not used to cluster documents. In some embodiments of the invention, the stopwords files may be edited by a user wishing to exclude specific frequently occurring words from the K-map. Scanner 124 may remove words found in the document matching the stopwords, mark the remaining words as tokens, and remove spaces between words (tokens), reducing the amount of data by trying to reduce words to their stem (e.g., tokens=>token, sleeping=>sleep etc.), and eliminating language-specific parts of speech using language tags.

Figure 1E:
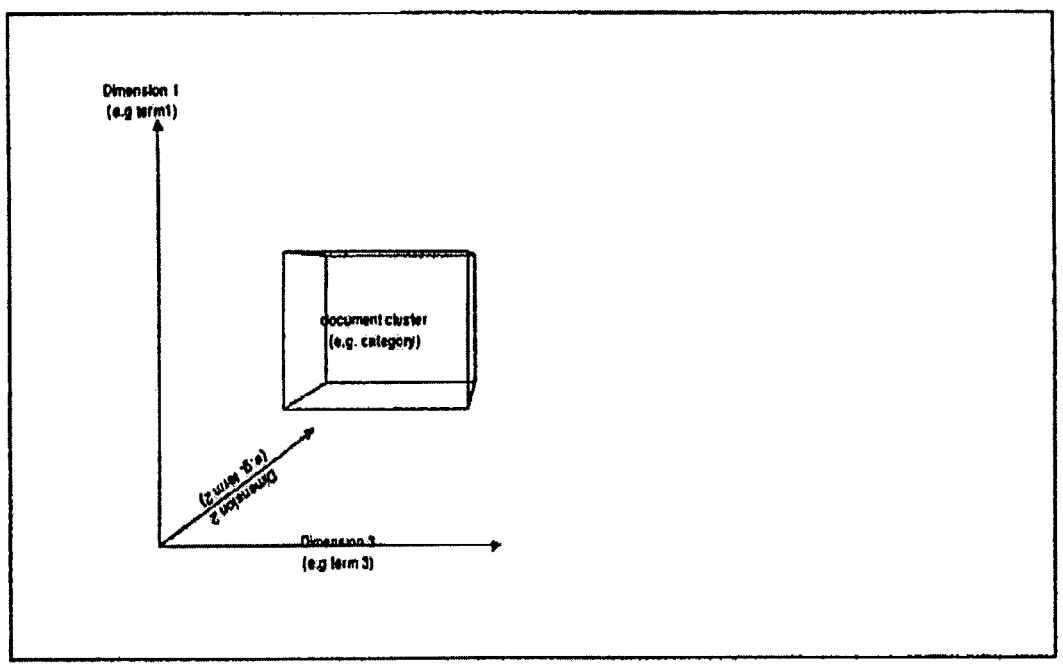
FIG. 1E illustrates categorizing contents of information in multiple dimensions according to one embodiment of the invention.

K-map builder 126 may intelligently specify categories and sub-categories for the extracted data using one or more algorithms. In one embodiment, K-map builder 126 may statistically analyze the words in documents to create groups of similar documents called clusters. As illustrated in FIG. 1E, the K-map builder 126 may treat words and phrases in documents as points in a large, multidimensional space, based on one or more algorithms in a software, for example, IBM's Sabio. Each dimension may correspond to a single word or phrase and the number of times it appears. When two documents share many of the same words and phrases, they may be relatively close together in this space, and may appear in the same document cluster. In some embodiments, K-map builder 126 may build document clusters, create labels for these clusters, and classify new documents into existing clusters. In other embodiments, K-map builder 126 may identify documents that do not fit into any existing clusters.

According to one embodiment, K-map builder 126 may use, for example, a combination of EM (expectation-maximization) and K-means clustering techniques to build initial clusters, and the SVM (Support Vector Machines) classifier for categorization. These techniques may find general themes in collections of documents. In some embodiments, these techniques may require a user to reorganize the clusters. According to another embodiment, K-map builder 126 may divide information into a plurality of clusters, and then subdivide these clusters into a plurality of sub-clusters. Once an initial set of clusters has been created, K-map classifier 128 may compare the words in new documents to the words in the documents in the clusters it has already created. In some embodiments, K-map classifier 128 may automatically classify the extracted data into the specified clusters and sub-clusters. In other embodiments, K-map classifier 128 may enable a user to create a K-map by classifying the extracted data into the specified categories and sub-categories. The K-map may be stored in map database 130. In some embodiments, a user may edit the K-map using editor 132.

Taxonomy engine 110 may also categorize updated data and new data in the one or more repositories 102. In one embodiment, K-map builder 126 of taxonomy engine 110 may add new documents to the K-map as new documents may be added to the repositories 102 searched by its spider component 104. Taxonomy engine 110 may classify new documents by comparing them to documents in the existing clusters. When editors move documents to different clusters, new documents with words that are statistically similar may be classified into these different clusters. In some embodiments, taxonomy engine 110 may be notified of all changes made by human editors using the taxonomy editing tool in order to recompute whatever internal model is being used to describe categories based on the changes made by the human editor. This may include, for example, making inferences based on the actions, performing statistical analysis, doing nothing at all, etc., depending on the particular classification method being used. In one embodiment, the creation of the K-map may be scheduled for a specific time interval using scheduler 134.

According to another aspect of the invention, taxonomy engine 110 may calculate and assign a value or a score to documents in the one or more repositories 102. Document scoring is an approach to evaluate the content of a document in the K-map. In taxonomy engine 110, this value may be controlled by a plurality of parameters, which a user may control by means of their weight on the computed document value. The plurality of parameters may include, for example, links to a document, links from a document, responses to a document, times a document has been opened using the K-map, recency of the last update to a document, etc. Taxonomy engine 110 may rank the documents based on the assigned value or score to create a list of ranked documents. The top-most trigger in this list may represent the value with the highest weight on the calculation of the document value. The higher this number "value" is, the more useful the associated document is meant to be for the users. In some embodiments, this value may be used to bring more "valuable" content to the top of collections either in a particular category or in a given search result. For example, a search on full text might produce hundreds of documents whose relevance rank is the same. The document value may then be used to bring the documents that people are reading, modifying, linking to and responding to, to the top of the list thereby providing the most useful search results to the user first. In some embodiments, a user may change the ordering of the lists.

Figure 1F:
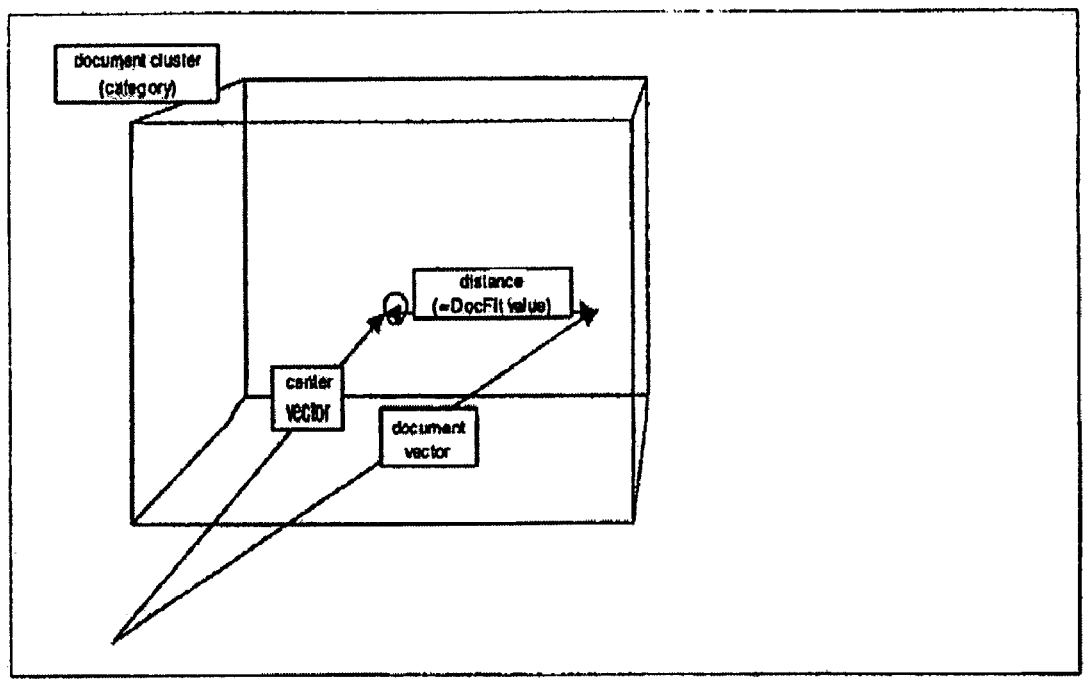
FIG. 1F illustrates a mechanism for calculating a document fit value for categorizing documents according to one embodiment of the invention.

According to one embodiment of the invention, as illustrated in FIG. 1F, taxonomy engine 110 may calculate a "document fit value" that may be viewed using the K-map editor tool. The "document fit value" is a number representing the fit of a particular document into a certain category relative to the categorization algorithm being used for that category, the other documents in the category, and perhaps the siblings of that category. This value may refer to a similar attribute computed for the K-map, telling a user whether a document fits into a certain category perfectly, or doesn't fit completely in a category but—in terms of content relation—fits this particular category rather than another. This value may also be referred to as a "vector distance," a vector in the K-map document space (representing a document) from the very center of a K-map cluster, which is, in fact, a category in the K-map. In some embodiments, a fit value is expressed on a range from 0.0 to 1.0, where 1.0 represents of a perfect fit and 0.0 represents no fit. This value may be used by the system maintainers to make decisions regarding the structure of the taxonomy including moving documents with poor fits, creating new categories or subcategories that have better cohesion or placement in the overall taxonomy, etc.

Figure 1G:
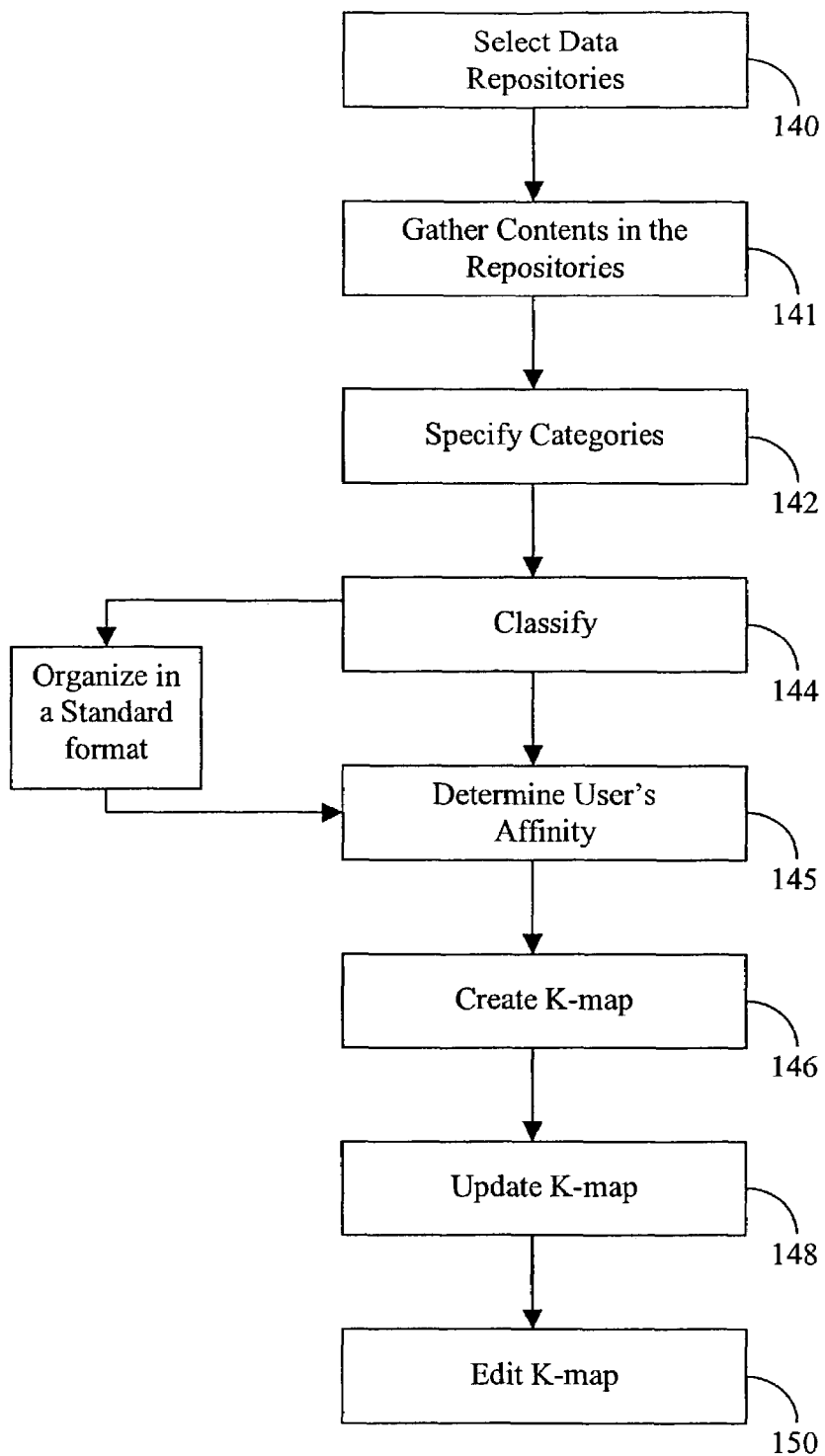
FIG. 1G illustrates a method of knowledge mapping according to one embodiment of the invention.

The process of creating a K-map is illustrated in FIG. 1G. According to one embodiment, in an operation 140, a user may select one or more repositories 102 from which a K-map is to be constructed. In an operation 141, system 100 may scan contents in the selected one or more repositories 102 and gather the contents.

According to another embodiment, in an operation 142, system 100 intelligently assumes and specifies one or more categories and in some embodiments, one or more subcategories for each category System 100 "assumes" that documents that are statistically similar to one other include similar content. In some embodiments, the categories may be established by spidering documents in the selected repositories, and selecting certain words that occur within the documents. These selected words are referred to as cluster terms. In one embodiment, this selection may be based on a value referred to as a term-discrimination value, which may be used to balance the size of all clusters, so that none become too big or too small. Selecting the cluster terms ensures that a vector space for selected repositories is not too wide or too narrow to find appropriate clusters. This may be done by putting the clusters in a single cluster tree, referred to as a taxonomy. The cluster terms may represent dimensions in a multidimensional space (each cluster term represents one dimension) to be used when placing documents in this vector space.

According to another embodiment, in an operation 144, the scanned contents are classified for establishing a map. For example, documents may be placed in a vector space. The more frequent cluster terms may be counted to determine a value of frequency. The placement of a document in the dimension of a cluster term may be determined by this value. This may be done for every cluster term (dimension) until the document can be placed into the vector space as a point or vector (from the origin of the vector space to the location in the vector space where a document has been calculated to be placed). Documents or vectors that are near each other may be defined to belong to one cluster. This cluster may be named after the cluster terms found in most documents in this cluster. Cluster terms found in fewer documents may not be selected to label a cluster (even though the documents containing these particular cluster terms still belong to this cluster). Clusters that are found near each other in this multidimensional space may be clustered into one cluster. This cluster may be named after the most frequently used words in the documents the cluster contains. This process may be repeated until there is only one cluster left over, representing a root of the taxonomy tree.

According to another embodiment, in an operation 145, taxonomy engine 110 determines a relationship (e.g., affinity) between each document in a cluster and persons that have interacted with each document. In an operation 146, K-map is created based on clustering of the documents and a person's affinity to the clustered documents.

According to another embodiment, in an operation 148, the K-map may be updated by comparing the words in new documents (and documents designated as uncategorized documents in the K-map) to the words in the clusters it has already created. If the new documents are similar to the documents already in existing categories, the new documents may appear in the same categories. If the new documents are not similar (that is, they do not use cluster terms similar to those in documents already clustered into categories), taxonomy engine 110 may designate them as uncategorized documents. Documents designated as uncategorized may then be evaluated by the human editor as part of the process of K-map refinement.

In an operation 150, a user may edit the K-map using K-map editor 132. In one embodiment, K-map editor 132 may establish direct access to the K-map, rather than going through a work queue. In addition, K-map editor 132 may also enable the user to modify the taxonomy of K-map. A user may also specify categories and sub-categories for a document using K-map editor 132.

Figure 6A:
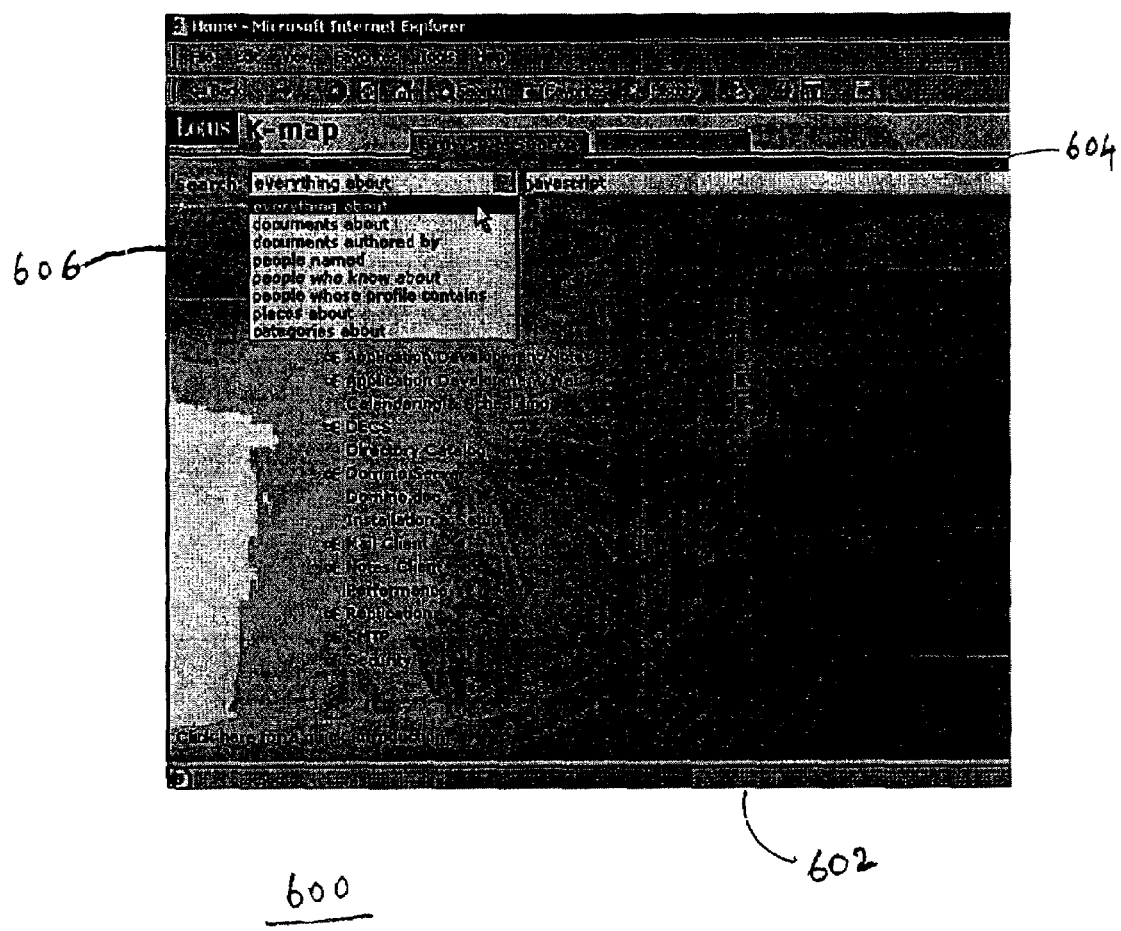
FIG. 6A illustrates a user-interface of a knowledge map information retrieval system according to one embodiment of the invention.

According to another aspect of the invention, K-map may be used as an efficient search system. As illustrated in FIG. 6A, search queries may be submitted to a K-map information retrieval system 600 using full text queries. In general, information about documents contents, document and meta-data, and their associated categories, as well as information about the people interacting with those documents (i.e., profiles) are all indexed by the full-text subsystem. This allows general searches to return references to categories, documents, and people profiles. For example, a search for "Java Programming" may identify hundreds of documents which mention the terms "Java" and "Programming," a couple of categories "Java Programming Standards" and "Java Programming" as well as several people who have "Java Programming" in the skills field of their respective profiles. Thus instead of having to access several disparate systems to search for these elements independently, they may accessed via one system.

In the case of the K-map, the map database 130 stores the documents included in the taxonomy (or in some embodiments, references to the documents). This provides an effective mechanism to search for content. In some embodiments, system 600 may include a caching mechanism with a configurable expiration time that caches information that has been queried from the backend databases. For example, using various default settings, this cache may be refreshed every 60 minutes, and may be populated using the first query on the K-map submitted by any user. In one embodiment, when the cache exceeds a predetermined size, the least recently used cache entry may expire.

In some embodiments, various search criteria may be used including phrase matching (match entire string exactly, even if unquoted), fuzzy search (match alternate spellings), partial-word matching (match words containing search term), stemming (match part of string), thesaurus (match alternative words for query string), partial-word matching (match word containing search term), documents authored by_phrase matching, people named_phrase matching, people who know about_phrase matching, people whose profile contains-_phrase matching, etc. In other embodiments, search criteria may include logical operators (e.g., AND, OR, etc.,) and mathematical characters (e.g., $\Sigma$, etc.), and expressive characters (!). In some embodiments, a wildcard search may be included to improve performance.

According to one aspect of the invention, K-map information retrieval system 600 may include a global text retrieval (GTR) engine (not otherwise illustrated). The GTR engine may use n-gram technology, which creates an index by breaking words down into "grams," or strings having a uniform number of characters, to facilitate quick and efficient searching. The optimum number of characters in the string (the "n" in n-gram) may vary in different languages: for English and other Latin-derived languages, it may be three characters; for Asian languages, it may be two, etc. The GTR engine may support many languages and may have the ability to index documents that contain text in more than one language by adhering to a standard referred to as Unicode, thus making it a good choice for a product intended for international use. The GTR engine may also include "fuzzy" search and stemming capabilities. In one embodiment, keeping track of partial matches between strings of characters may be accomplished by the GTR engine.

As illustrated in FIG. 6A, K-map information retrieval system 600 includes a graphical user interface (GUI) 602 that may show information resources from disparate systems in a single view which can be searched or browsed. The information presented in the K-map may be automatically generated and maintained on the backend by a server (e.g., a Lotus Discovery Server) and modified by systems administrators.

Figure 6B:
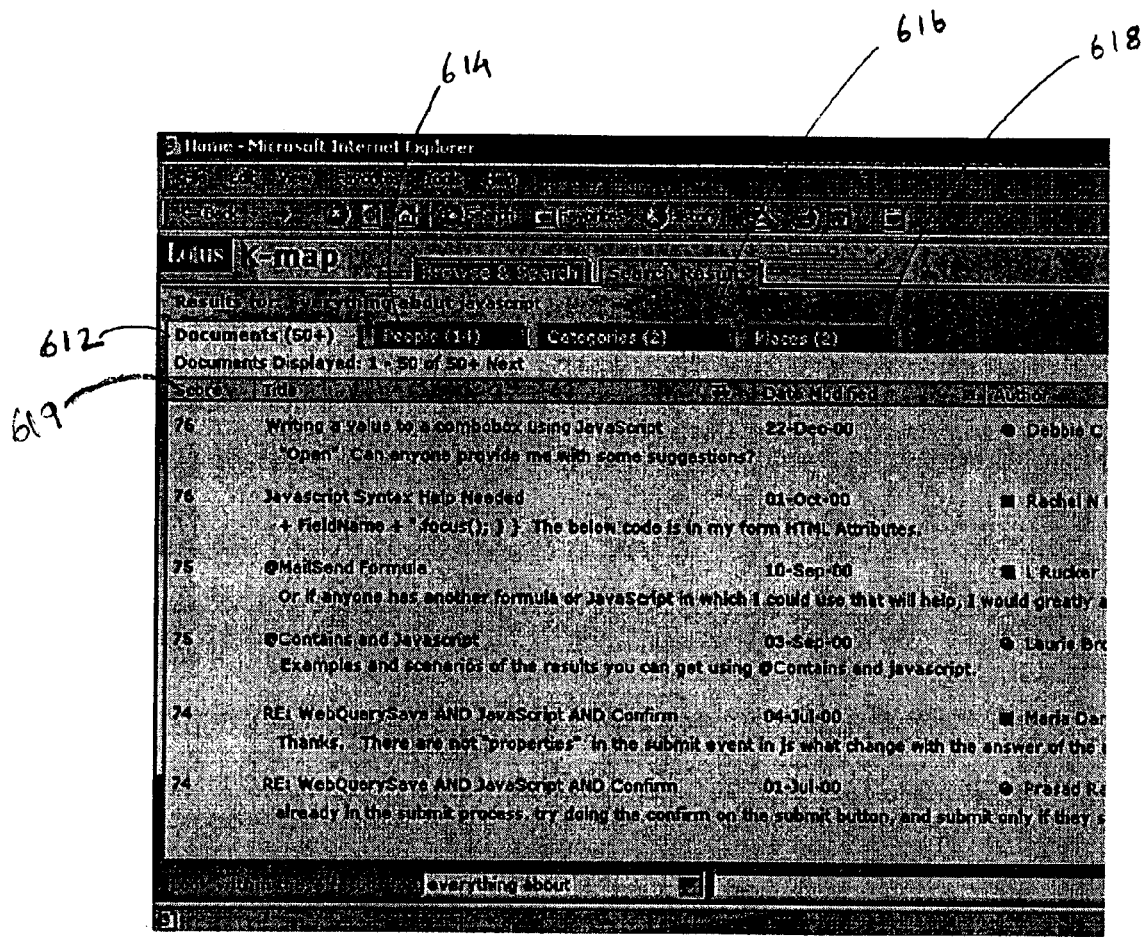
FIG. 6B illustrates exemplary selection features of a user-interface of a knowledge map information retrieval system according to one embodiment of the invention.

The K-map GUI 602, as illustrated in FIG. 6B may display multidimensional features comprised of documents 612, people 614, categories 616 and virtual places or repositories of information 618.

As illustrated in FIG. 6A, a user may input a search string in a input box 604. Using the drop down refinement list of search criteria 606, a user may include a plurality of search criteria. For example, a user may decide to search, "everything about" the input search string.

The K-map information retrieval system 600 of FIG. 6B may display the search results. A user may view various aspects of the search results using, for example, tabs within the GUI associated with various information resources. For example, a user may find categories 616, documents 612, people 614 and places 618 that contain information related to the input search string (e.g., JavaScript).

Documents may refer to multiple types of text-based files from various locations in an organization, such as, for example, Lotus SmartSuite or Microsoft Office files, Web pages, Lotus Notes databases, etc.

The user may quickly scan the document summaries derived by the system 100 to help determine which documents are relevant. The user may also click on the column headings to easily change the view and see other information about the document such as its author, from where the document was retrieved, etc.

In some embodiments, K-map information retrieval system 600 may display a search score 619 (e.g., a number between 1 and 100) with each of the documents in the search results, and may list the documents in an order based on this score. A document with a high score, for example, may be the most relevant to the search terms. The search engine may use various mechanisms for scoring and ranking as would be apparent. In one embodiment, the ranking may depend, for example, on the size of the document being searched, the number of matches, and the location of the matches within the document. For example, a large document with two matches, one in the beginning and one in the middle of the document, may be assigned a lower score than a smaller document with two matches at the beginning of the document. According to one embodiment, system 100 may use statistical data on word usage frequency to make sure that words like "a," "the," or "of" have less or no weight than those that are less frequently used.

In one embodiment, documents 612 may include rankings for relevancy of information. In other embodiments, documents 612 may include scores for relevancy of information. A ranking may be derived by the system 600 based on its advanced metrics and analysis services that relate one or more person's activity with documents to determine value.

According to another embodiment, document usage patterns may also be factored into the scores using information collected by the spider component 104. These factors may include how many persons have accessed each document, how many times a document has been accessed by each person, how many links there are to and from the document, etc. All of these factors may be updated each time the spider component 104 operates to update the index.

To reduce time spent on trial and error, the system 600 may allow the user to find one or more persons who have experience with the subject matter associated with a given search string. The system 600 may return a list of one or more persons associated with the input search string and in some instances, their "affinity" ranking to that subject matter.

Figure 6C:
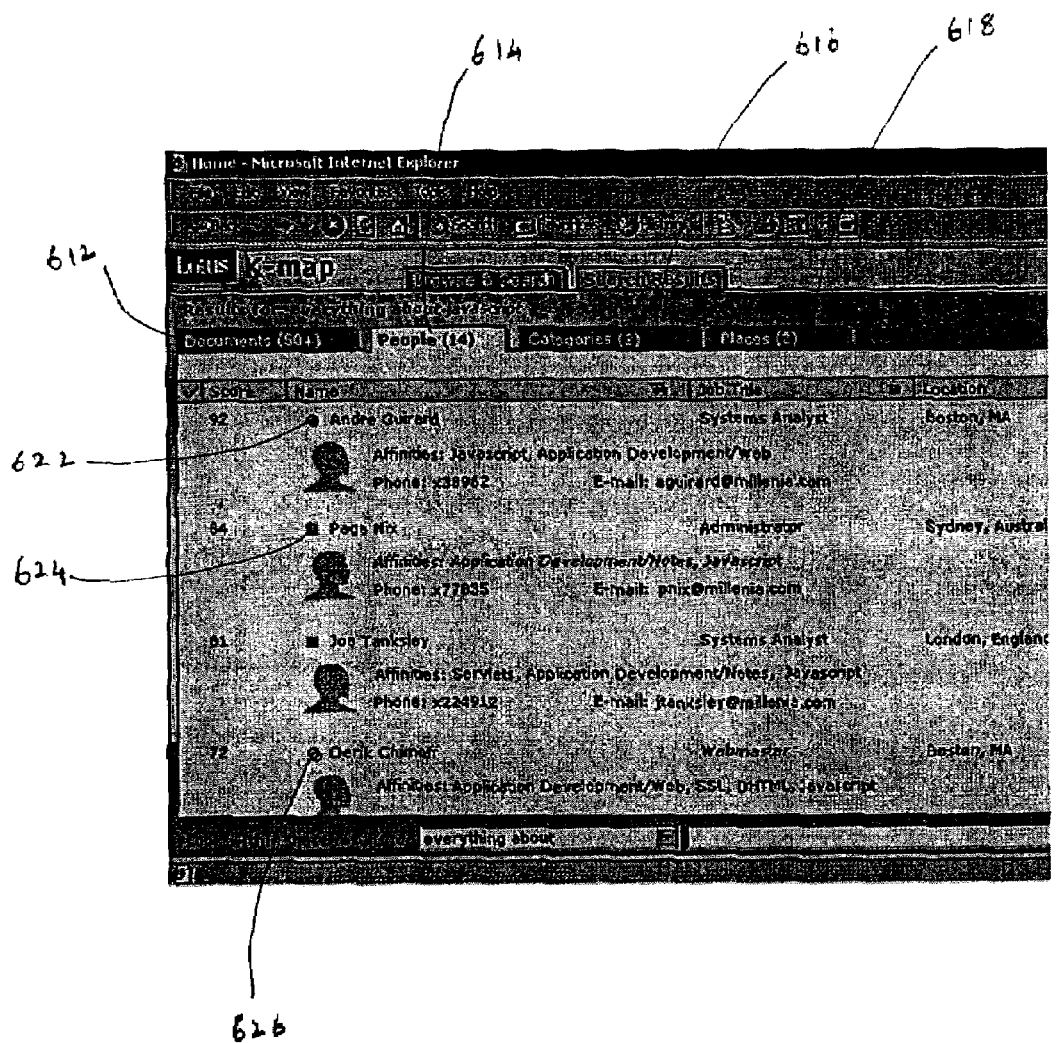
FIG. 6C illustrates exemplary indication features of a user-interface of a knowledge map information retrieval system according to one embodiment of the invention.

As illustrated in FIG. 6C, based on people awareness icon (e.g., element 622, 624, and 626) next to each person's name, the user may immediately determine if the person is online and available to be contacted. For example, filled round icon 622 may indicate that the person is available; square icon 624 may indicate that the person is unavailable; unfilled round icon 626 may show that the person is not online; and black circles may signify "do not disturb." Other designations or icons may be used as would be apparent.

Figure 6D:
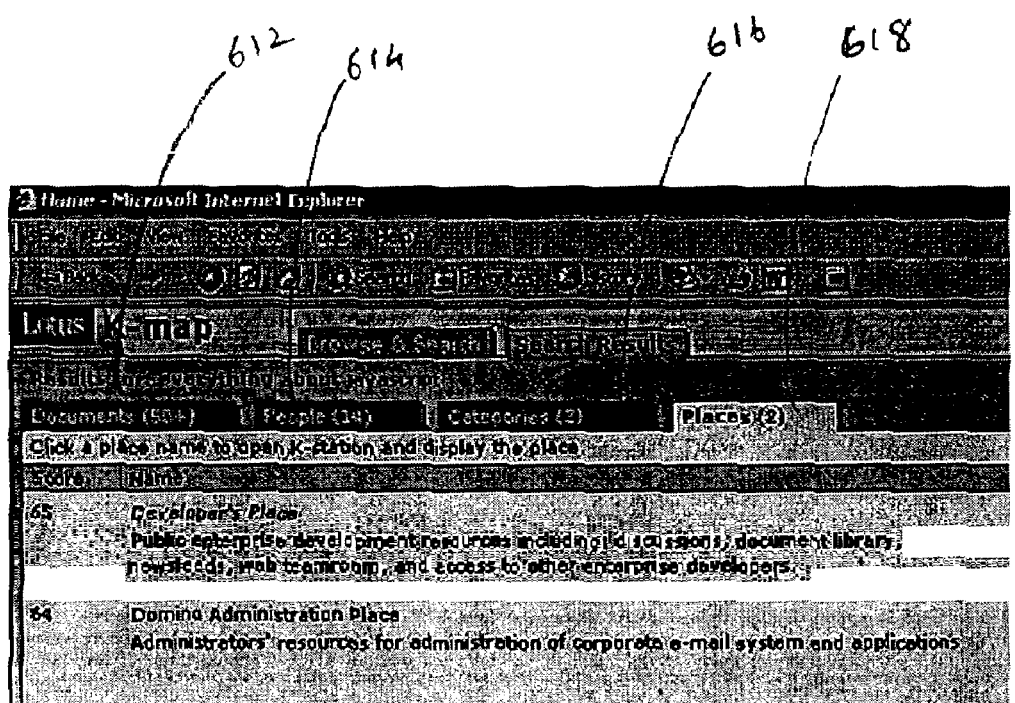
FIG. 6D illustrates exemplary interface features for a community place of a knowledge map information retrieval system according to one embodiment of the invention.

As illustrated in FIG. 6D, a user may link to a discovered "community" that might include any combination of discussion forums, document libraries, bookmarked Web pages, etc., related to the user's topic of interest. In order to find out if there is additional information that can help, the user may also browse the K-map—drilling down on the topic category of Application Development to see additional sub-categories, documents, people and places associated with Application Development.

Figure 6E:
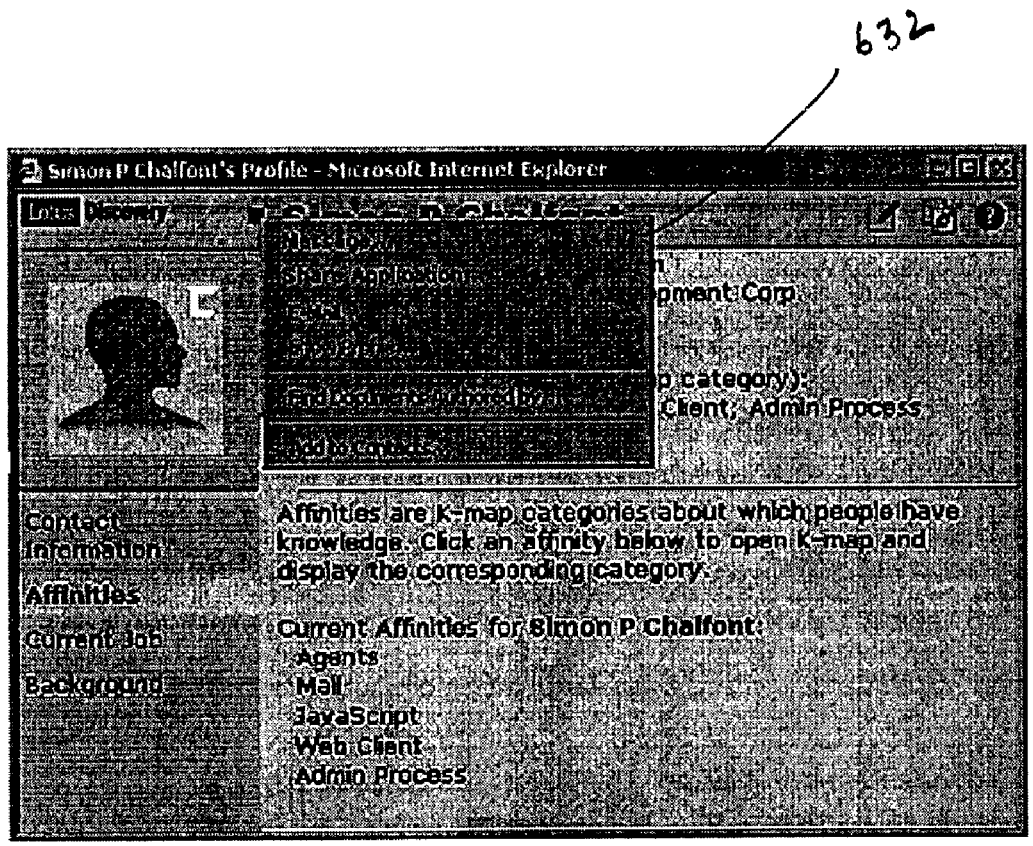
FIG. 6E illustrates exemplary communication features of a user-interface of a knowledge map information retrieval system according to one embodiment of the invention.

As illustrated on FIG. 6E, a user may click on one of the persons to launch a profile with contact, job and background information, as well as associated "affinities" to various topics (illustrated in FIG. 6E) for a particular person. Although the system 600 may keep the profiles up-to-date, in some embodiments of the invention, each system user may authorize which discovered affinities are displayed, and can make manual additions or deletions in his or her profile.

According to another embodiment of the invention, as illustrated in FIG. 6E, system 600 provides a mechanism for communicating with one or more persons having affinity to the documents of the search results. For example, a communication may be established to a high affinity person for an information (e.g., Java Script) by selecting one of the features of message, share application and e-mail in menu 632.

While viewing a profile, a user may find one or more persons within the organization, but not necessarily within the user's group, team, business unit, etc., with a high affinity to the topic of interest. The user (i.e., search performer) may see that this person is online and available. A pop-up collaboration menu (not otherwise illustrated in FIG. 6E) may provide the user with options to send an instant message or email, search for all documents authored by the selected person or add a person to the search user's contact list.

Figure 7:
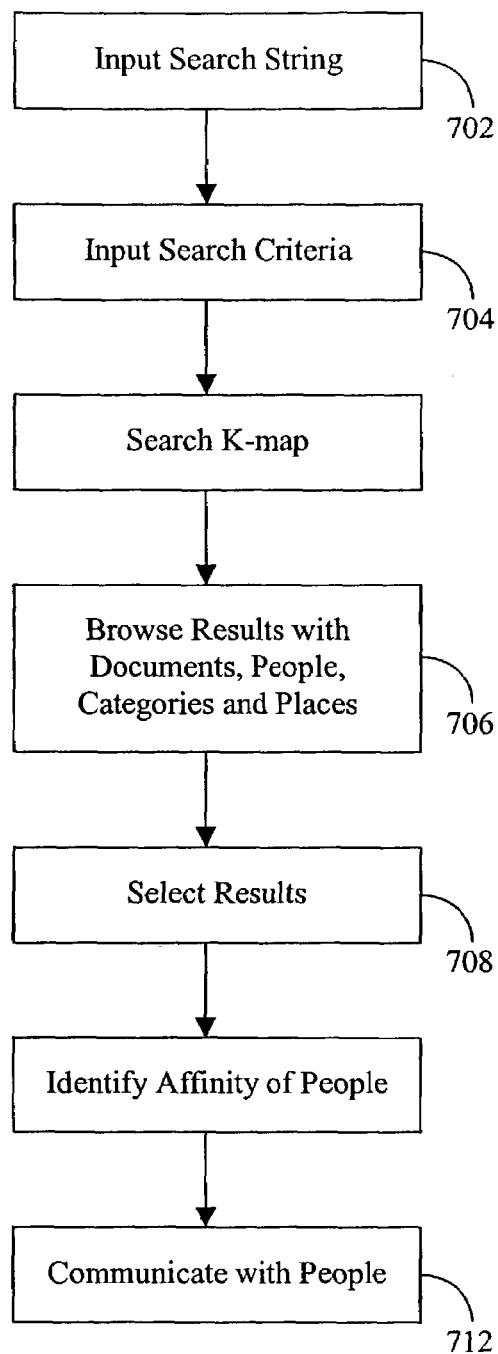
FIG. 7 illustrates a method for performing a search using a knowledge map information retrieval system according to one embodiment of the invention.

FIG. 7 illustrates a process of performing a search using K-map information retrieval system 600. A search string may be input, as shown in an operation 702. A user may also input one or more search criteria to refine the search for the inputted search string as shown in an operation 704. The system 600 may perform the search using k-map, and in an operation 706, return the search results including, for example, documents 612, people 614, categories 616, and/or places 616 matching the search string. Search results corresponding to the search string may be selected, as shown in an operation 708, and affinity of particular persons to the search results may be identified. In some embodiments, one or more persons 614 may be selected and their affinity to the documents of the search results may be identified. In other embodiments, documents 612 may be selected and their corresponding affinity to the documents of the search results may be identified. The system 600 may also enable a user to locate subject matter experts (based on, for example, their affinity to a subject matter). In some embodiments, the system 600 may automatically create a network of subject matter experts. In other embodiments, the system 600 may enable a user to create such a network. As illustrated in operation 712, a communication can be established to persons having high affinity to documents included in the search results.

According to another embodiment, in order to find all documents clustered within the created taxonomy, the system 100 may utilize the K-map indexer to index all the documents put onto the queue for scheduling. When a document is indexed, the system 100 indexes all contents of the documents. The index information may be broken out by repository 102 into different indexes. The system 100 may include one logical index, which may be made up of several separate physical index segments. For example, in LotusNotes bases system, the index files may be in the file system under \Lotus\DS\Data\ftdomain.di\Discovery Server in eight separate directories named LDSIDX00 through LDSIDX07. Other numbers of index segments may be used as would be apparent.

According to one embodiment, K-map information retrieval system 600 may maintain user profiles in a repository that may be queried directly to locate experts by skill, experience, project, education, and job type. The profiles may be created either by drawing demographic data from the system 100, or by mapping fields from other specific applications such as, for example, team rooms, discussions, and project tracking.

Figure 8:
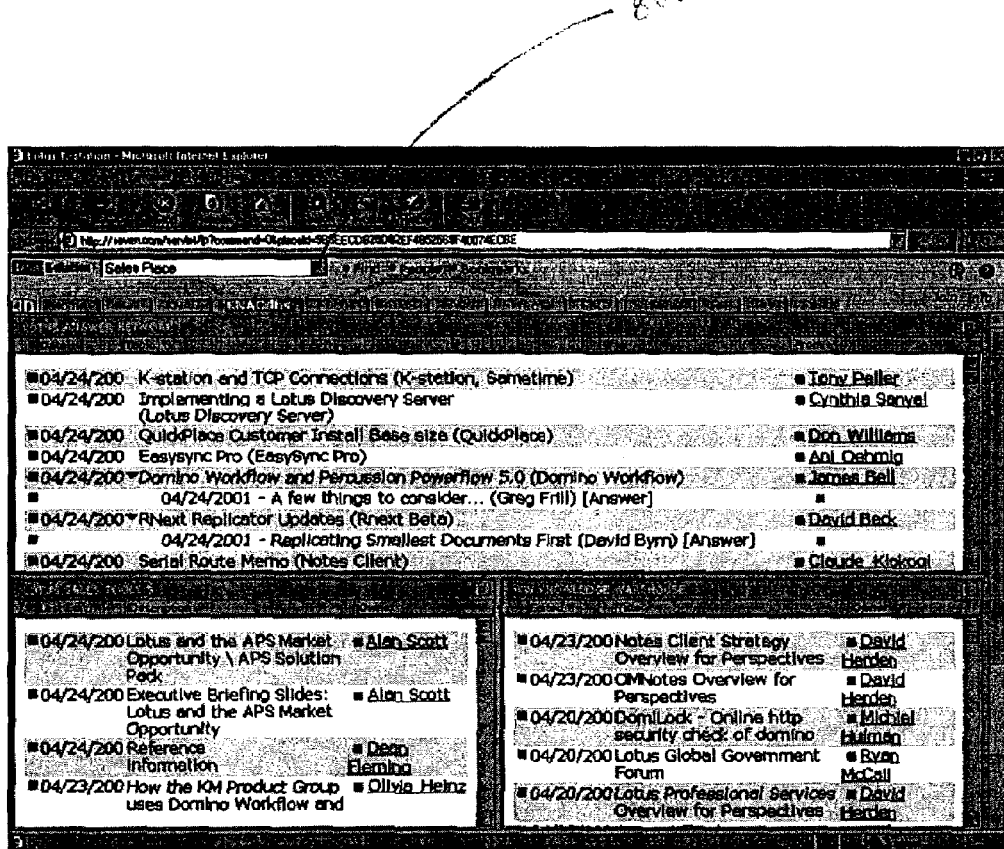
FIG. 8 illustrates an exemplary user interface for a knowledge station portal system.

According to another embodiment of the invention, as illustrated in FIG. 8, the system 100 may include knowledge station (K-station) portal 800. The K-station portal 800 may organize all of a user's information, applications, and contacts by community, interest, task, or job. In some embodiments, a user may personalize aspects of this portal by, for example, selecting from a list of preconfigured "portlets" (e.g., mail, calendar, discussions, to-do items, team rooms, custom applications, and Web sites), in essence, creating a "personal place." Each user's personal place may provide access to a list of other public places that other users can join.

According to yet another embodiment, K-station portal 800 may include multiple places (e.g., sales place 802). In some embodiments, these multiple places may be defined by users, created by departmental or enterprise IT (information technology) departments, or developed and shared by colleagues. K-station portal 800 may also include activity-based community places (e.g., a "new product brainstorming place"). In these places, users may monitor project status and participate in decision-making. For example, a sales place might include a sales-results reporting application, an information retrieval application, a list of sales tools, and a list of marketing staff available for consultation. In some embodiments, a user may determine participants in these community places. In other embodiments, the system determines participants based on their affinity to the subject matter of the activity in the community place. The K-station portal 800 may save time by introducing the user of system 100 to those persons, applications, and information assets available to the user to improve, for example, productivity.

Figure 8A:
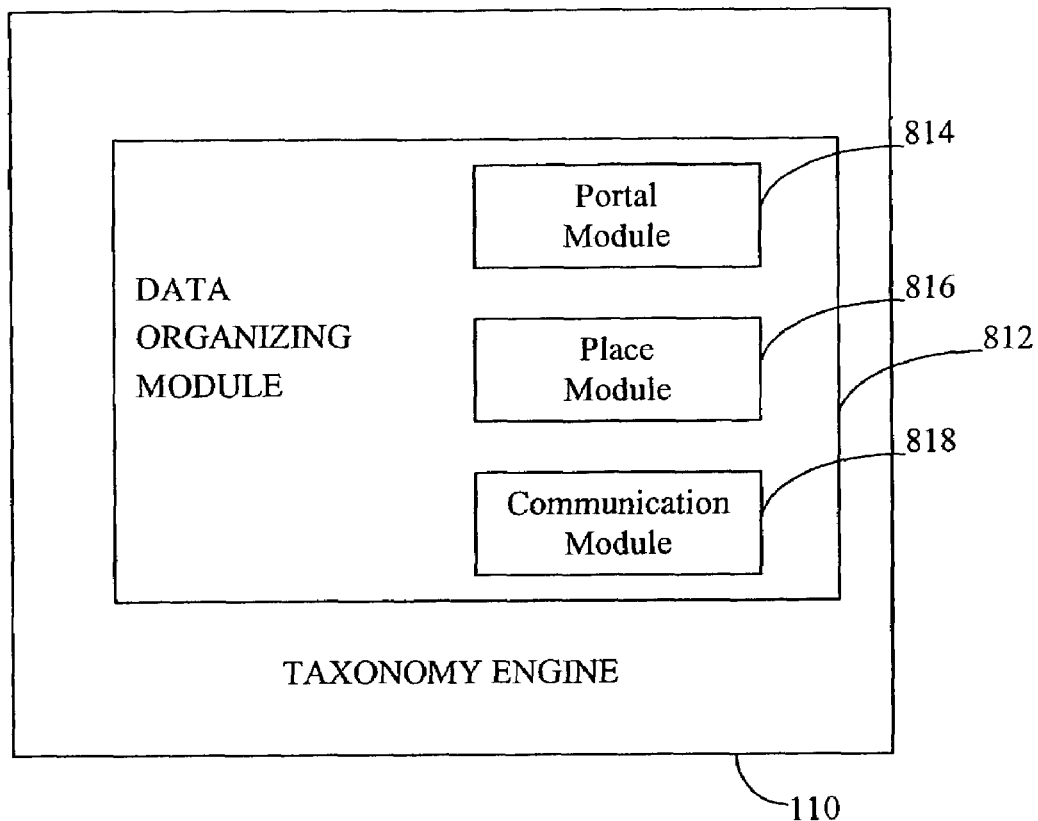
FIG. 8A illustrates a system for organizing knowledge data according to one embodiment of the invention.

According to one embodiment of the invention, as illustrated in FIG. 8A taxonomy engine 110 of system 100 may include or otherwise be coupled to, for example, data organizing module 812. The data organizing module 812 organizes and represents knowledge data based on a user's affinity to knowledge. The data organizing module 812 may include or otherwise be coupled to, for example, a portal module 814, a place module 816, and a communication module 818. The portal module 814 may provide one or more portals that enable a user to view or otherwise access a plurality of data repositories 102a-n and applications. In some embodiments, portals may include or otherwise be coupled to one or more applications, for example, but not limited to e-mail, calendar, and to-do items, discussion databases, team rooms, bulletin boards, etc. According to one embodiment, portals may include a search input window for searching the contents of the one or more documents in the one or more user selectable data repositories 102. A user may organize one or more search results and one or more persons having affinity to the search input. In some embodiments, a user may select one or more subject matters (e.g., sales activities) and monitor updates of the selected one or more subject matters and one or more persons having affinities to the selected one or more subject matters. In one embodiment, the system 100 may provide indices corresponding to the one or more persons and one or more subject matters. In one embodiment, these indices may be displayed within a portal. In another embodiment, these indices may be displayed within a place. A user may also communicate with the one or more persons having affinities to the selected one or more subject matters.

Place module 816 may provide access to one or more "places" where a user may organize and communicate knowledge data. These places may include, for example, a personal place, a shared place, a public plate, etc. For example, a personal place (e.g., 806 in FIG. 8) may enable a user to organize and represent knowledge data in an authorized and secured personal place in the system 100. A user may select one or more portals and organize the one or more portals in the personal place. In public place of the system 100, a user may search for and/or monitor one or more types of information that may be accessible to all other users in the system 100. Shared place of the system 100 may provide, for example, all the information, applications, links to contents of the one or more documents in the one or more user selectable data repositories 102 and one or more persons having affinities to one or more subject matters or contents of the one or more documents in the one or more user selectable data repositories 102. In some embodiments, personal, public, and shared places may be organized in a display of graphical user interface. In another embodiment, personal, public and shared places may be organized in a plurality of displays in graphical user interface. According to one embodiment of the invention, each place may include or otherwise be coupled to one or more portals. In some embodiments, a place may include one or more portals, a list of one or more indices to one or more persons having affinity to knowledge in a display, and communication modules to communicate with one or more persons. A user may select and organize one or more portals within one or more places.

Communication module 818 may enable a user to communicate with one or more persons having affinities to knowledge data. In some embodiments, the communication module 818 may be coupled to place module 816. In some embodiments, the communication module 818 may be coupled to portal module 814. In some embodiments, communication module may include one or more applications, for example, e-mail, chat room, bulletin board, etc.

Figure 8B:
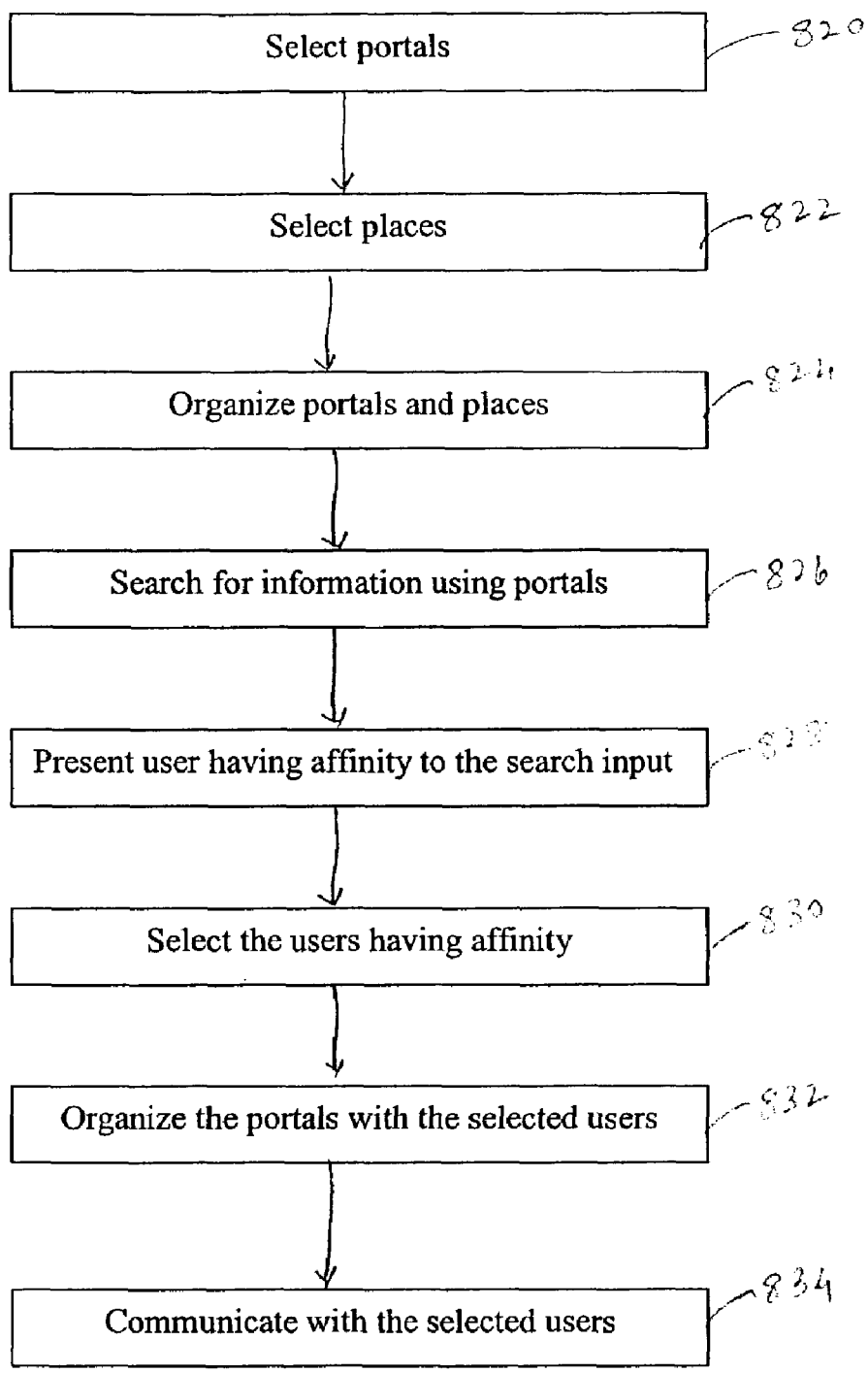
FIG. 8B illustrates a method for organizing knowledge data according to one embodiment of the invention.

A process for communicating with one or more persons having affinity to knowledge data according to one embodiment of the invention is illustrated in FIG. 8B. In operation 820, a user may select one or more portals of the system 100. In an operation 822, the user may also select one or more places of the system 100. In an operation 824, a user may organize the selected one or more portals and the selected one or more places within one or more graphical user interfaces. In some embodiments, a user may input a search string in the search input window of a portal and perform a search within the contents of the one or more documents in the one or more user selectable data repositories 102. In some embodiments, in an operation 826, a user may also search for one or more persons having affinities to the search input. In one embodiment, in an operation 828, the system 100 may present one or more persons having affinities to the search input in user selected places. In another embodiment, the system 100 may present one or more subject matters (e.g., sales forecast) of the contents relevant to the search input (not otherwise illustrated). In one embodiment, in an operation 830, the user may select one or more persons having affinities. In another embodiment, the user may select one or more subject matters (not otherwise illustrated). In yet another embodiment, a user may select one or more indices to the one or more persons or the one or more subject matters (not otherwise illustrated). In some embodiments, in an operation 832, a user may organize the one or more portals, one or more of the selected one or more persons having affinities, and one or more subject matters within the one or more user selected places. In an operation 834, a user may also communicate with one or more selected persons using one or more applications in communication module.

According to one embodiment, the one or more selected subject matters may include links to the one or more persons having affinities to the selected subject matters. According to another embodiment, the one or more of the selected one or more persons may be linked to all the subject matters with which they have affinities.

Figure 9:
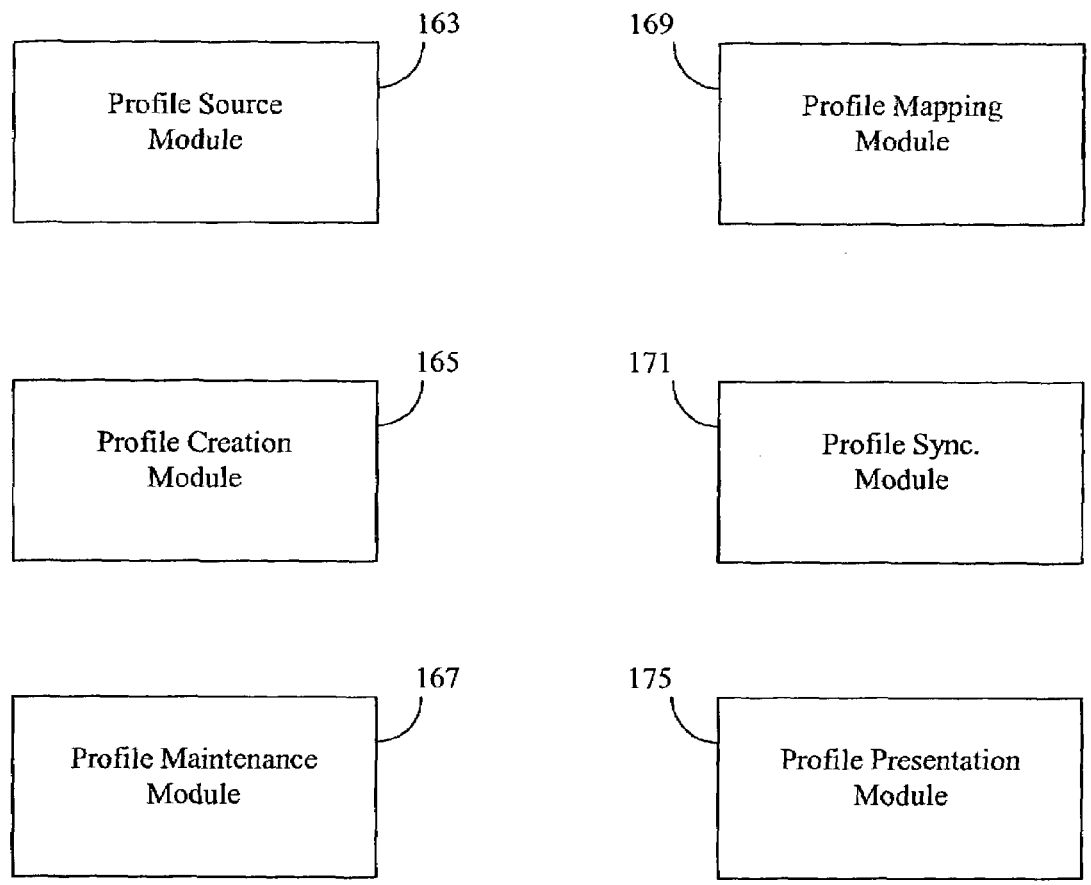
FIG. 9 illustrates a user profile system for knowledge data processing according to one embodiment of the invention.

According to another embodiment of the invention, as illustrated in FIG. 9, the system 100 may include, for example, a profile source module 163, a profile creation module 165, a profile maintenance module 167, a profile mapping module 169, a profile synchronization module 171, and a profile viewing module 175. Profile source module 163 may identify profile data of one or more persons in system 100. The profile data may include, for example, but not limited to, a name of a person, an affinity of the person to contents of one or more data repositories 102 in the system 100, availability of the person, contact information for the person, etc. Profile creation module 165 may determine affinities of one or more persons to contents of one or more user selectable data repositories 102 using one or more affinity calculating algorithms. Profile creation module 165 may, for example, periodically check the activities of one or more persons in the system 100, calculate affinities to the contents of one or more data repositories 102 based on these activities, and create profile data.

Profile maintenance module 167 may maintain profile data and the affinities included therein in profile database 136.

In some embodiments, the profile creation module 165 may include or otherwise be coupled to profile mapping module 169, and profile synchronization module 171. Profile mapping module 169 may map information to contents of documents in one or more user selectable data repositories 102 based on the person's affinity to the contents. If there is any change in person's affinity to contents of documents in one or more user selectable data repositories 102*a-n*, system 100 may synchronize the change using profile synchronization module 171. In one embodiment, the profile synchronization module may identify an existing profile map and modify the profile map based on the changes in the person's affinities. In some embodiments, this synchronization may be performed periodically. In other embodiments, this synchronization may be performed upon the person's approval. One of the purposes of profile synchronization is to track changes to the organizational and contact information for one or more persons. In one embodiment, profile presentation module 175 may present profile data of one or more persons of the system 100.

Figure 9A:
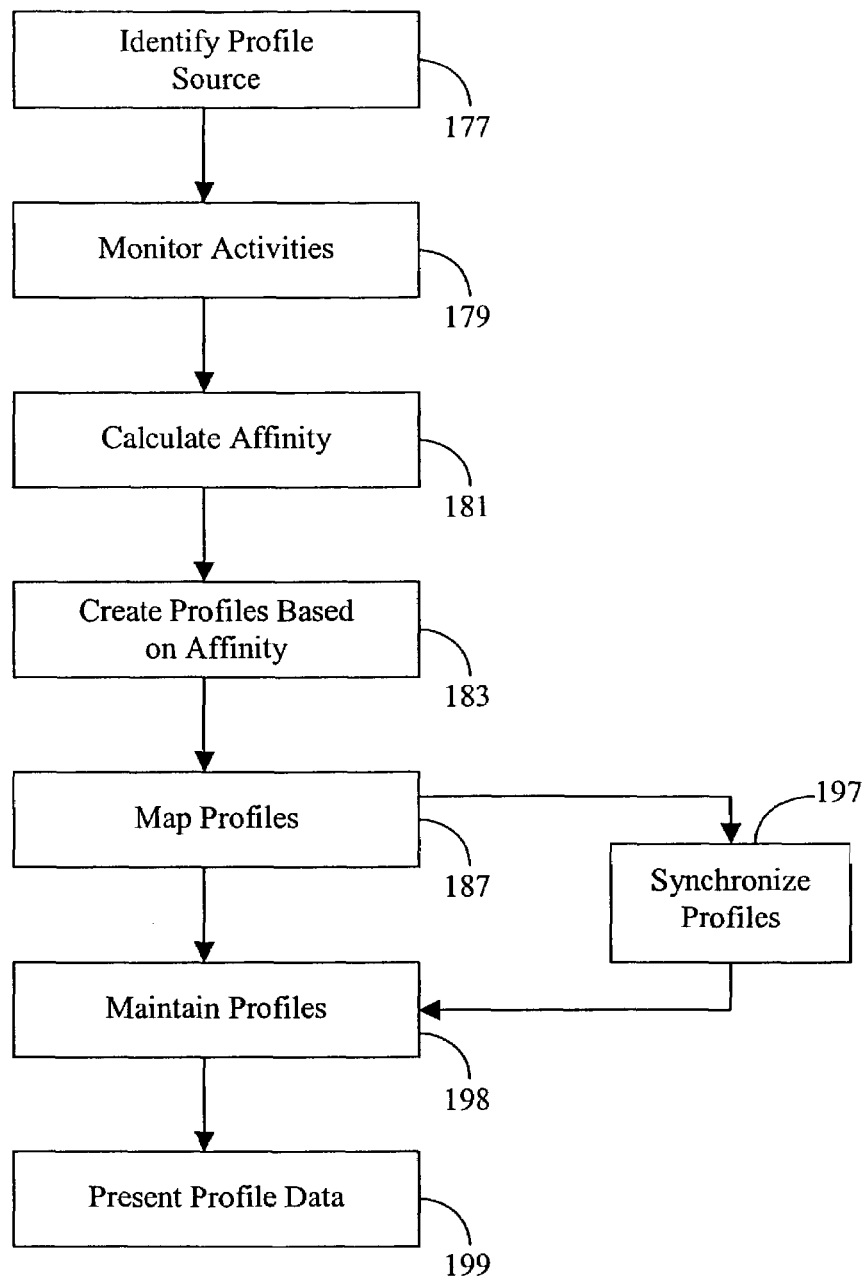
FIG. 9A illustrates a process of creating and synchronizing user profile data according to one embodiment of the invention.

A process of profile synchronization is illustrated in FIG. 9A according to one embodiment of the invention. In an operation 177, profile data of one or more persons may be identified using profile source module 163. In an operation 179, activities (e.g., accessing a specific subject matter or content of a document) of the one or more persons in the system 100 may be monitored. In some embodiments, these activities may be monitored for a specified period of time. In some embodiments, an administrator of the system may select one or more persons for monitoring their profiles. In an operation 181, affinity of one or more persons to contents of one or more user specified data repositories 102 may be determined based on the person's activities. The system 100 may create profiles based on these affinities in an operation 183.

In an operation 187, the system 100 may map user data (e.g., name of the user) to user's affinity data. This mapping may be performed by methods known to one skilled in the art. In some embodiments, when there is an update in mapping of user data to user's affinity data, the system 100 may synchronize the existing profile data with the updated information, at an operation 197.

In an operation 198, the system 100 may maintain profile data. In some embodiments, a user may request the system 100 to present profile data using profile presentation module 175, at an operation 199.

According to one embodiment, system 100 may provide mechanisms for organizations to develop customized solutions to specific knowledge management problems. Users and communities may aggregate important information and customize their workspaces using K-station, and then drill down more deeply when necessary by using the search and browse capabilities of system 100. In addition, system 100 may automatically collect the judgments of individuals (e.g., by analyzing their actions), and present these judgments in context at search time.

According to another embodiment, changes in knowledge may be gathered and tracked by the system 100, and the K-map may be dynamically revised. Implementation of these knowledge management components may be analyzed by content managers. In some embodiments, the system 100 may automatically find, organize, and map disparate content and add value to content by maintaining its context and by incorporating the opinions and judgments of individuals.

Other embodiments and uses of the invention will be apparent to those skilled in the art in consideration of the specification and practice of the invention is disclosed herein. The specification and examples should be considered exemplary only. For example, although the invention has been described in terms of a document, a document may be any document that may be categorized; for example, electronic mail messages, graphic files, or other type of electronic document. Additionally, although the invention has been described in terms of multiple modules, fewer or a greater number of modules may be used and modules may not be provided in the same location. The scope of the invention is only limited by the claims appended hereto.

What is claimed is:

1. A method for organizing knowledge data comprising:
   enabling a user to specify a subset of knowledge data, wherein the knowledge data is organized according to one or more topical categories, the knowledge data comprising (i) user profiles that include information about one or more individuals, and (ii) documents that include information content created, edited, and/or accessed by the individuals, and wherein the information about the individuals included in the user profiles includes affinities of the individuals to documents and affinities of the individuals to the topical categories;
   providing a place associated with the subset of the knowledge data, said place including at least one portal having a search window for searching the subset of the knowledge data, a list for displaying indicia associated with individuals having user profiles that include an affinity to the subset of knowledge data, and communication means to initiate communication with these individuals;
   enabling the user to initiate a search of the subset of the knowledge data using the search window;
   performing the search of the knowledge data initiated by the user, wherein performing the search comprises (i) identifying one or more of the documents that include information content related to the search and (ii) identifying one or more of the user profiles that include affinities to the identified documents;
   displaying indicia associated with the individuals that correspond to the user profiles that include affinities to the identified documents;
   enabling selection of one or more of the displayed indicia; and
   initiating communication with the individual or individuals associated with the selected indicia.

2. A system for organizing knowledge data comprising:
   a place module that enables a user to specify a subset of knowledge data, wherein the knowledge data is organized according to one or more topical categories, the knowledge data comprising (i) user profiles that include information about one or more individuals, and (ii) documents that include information content created, edited, and/or accessed by the individuals, and wherein the information about the individuals included in the user profiles includes affinities of the individuals to documents and affinities of the individuals to the topical categories;
   a place, said place associated with the subset of the knowledge data, and said place including at least one portal having a search window for searching the subset of the knowledge data, a list for displaying indicia associated with individuals having user profile that include an affinity to the subset of the knowledge data, and communication means to initiate communication with these individuals;
   a search module that enables the user to initiate a search of the subset of the knowledge data using the search window and performs the search initiated by the user, and wherein performing the search comprises (i) identifying one or more of the documents that include information content related to the search and (ii) identifying one or more of the user profiles that include affinities to the identified documents;
   a display module that displays indicia associated with the individuals that correspond to the user profiles that include affinities to the identified documents;
   a selection module that enables selection of one or more of the displayed indicia; and
   a communication module that enables initiation of communication with the individual or individuals associated with the selected indicia.

3. A system for organizing knowledge data comprising:
   means for enabling a user to specify a subset of knowledge data, wherein the knowledge data is organized according to one or more topical categories, the knowledge data comprising (i) user profiles that include information about one or more individuals, and (ii) documents that include information content created, edited, and/or accessed by the individuals, and wherein the information about the individuals included in the user profiles includes affinities of the individuals to documents and affinities of the individuals to the topical categories;
   a place, said place associated with the subset of knowledge data, and said place including at least one portal having a search window for searching the subset of the knowledge data, a list for displaying indicia associated with individuals having user profiles that include an affinity to the subset of the knowledge data, and communication means to initiate communication with these individuals;
   a search means for enabling the user to initiate a search of the subset of the knowledge data using the search window and performs the search initiated by the user, and wherein performing the search comprises (i) identifying one or more of the documents that include information content related to the search and (ii) identifying one or more of the user profiles that include affinities to the identified documents;
   display means that displays indicia associated with the individuals that correspond to the user profiles that include affinities to the identified documents;
   a selection means for enabling selection of one or more of the displayed indicia; and
   a communication means for enabling initiation of communication with the individual or individuals associated with selected indicia.

4. The method of claim 1, wherein enabling the user to specify the subset of knowledge data comprises enabling the user to select one or more data repositories from a plurality of data repositories, the plurality of data repositories comprising data repositories of more than one repository type.

5. The method of claim 4, wherein the more than one repository type comprises two or more of a repository type provided by Lotus Notes, a repository type provided by Lotus QuickPlace, a repository type provided by Domino.Doc, an electronic mail type, or a web file system type.

6. The method of claim 1, further comprising displaying indicia associated with the identified documents.

7. The method of claim 6, further comprising retrieving the identified document or documents associated with the selected indicia.

8. The method of claim 1, wherein enabling the user to specify the subset of knowledge data comprises enabling the user to select one or more of the topical categories, and the specified subset of knowledge data comprises documents that have been assigned, based on the information content that they include, to the selected one or more topical categories.

9. The system of claim 2, further comprising a plurality of data repositories that store the knowledge data, the plurality of data repositories comprising data repositories of more than one repository type, wherein the place module enables the user to specify the subset of knowledge data by enabling the user to select a data repository from a plurality of data repositories, and wherein the specified subset of knowledge data is stored in the selected data repository.

10. The system of claim 9, wherein the more than one repository type comprises two or more of a repository type provided by Lotus Notes, a repository type provided by Lotus QuickPlace, a repository type provided by Domino.Doc, an electronic mail type, or a web file system type.

11. The system of claim 2, wherein the display module displays indicia associated with the identified documents.

12. The system of claim 11, further comprising a retrieving module that retrieves the identified document or documents associated with the selected indicia.

13. The system of claim 2, further comprising a taxonomy engine that assigns the documents to the topical categories based on the information content included in the documents, wherein the place module enables the user to specify the subset of knowledge data by enabling the user to select one or more of the topical categories, and the specified subset of knowledge data comprises the documents assigned to the selected one or more categories.

14. The system of claim 3, further comprising a plurality of data repositories that store the knowledge data, the plurality of data repositories comprising data repositories of more than one repository type, wherein enabling the user to specify the subset of knowledge data comprises enabling the user to select one or more data repositories from a plurality of data repositories, and wherein the specified subset of knowledge data is stored in the selected one or more data repositories.

15. The system of claim 14, wherein the more than one repository type comprises two or more of a repository type provided by Lotus Notes, a repository type provided by Lotus QuickPlace, a repository type provided by Domino.Doc type, an electronic mail type, or a web file system type.

16. The system of claim 3, wherein the display means displays indicia associated with the identified documents.

17. The system of claim 16, further comprising retrieving means for retrieving the identified document or documents associated with the selected indicia.

18. The system of claim 3, wherein the documents are assigned to the topical categories based on the information content included in the content, wherein enabling the user to specify the subset of knowledge data comprises enabling the user to select one or more of the topical categories, and wherein the specified subset of knowledge data comprises the documents assigned to the selected one or more topical categories.

* * * * *